(12) United States Patent
Lucia Specogna et al.

(10) Patent No.: US 11,042,850 B2
(45) Date of Patent: Jun. 22, 2021

(54) CARD ACCOUNT IDENTIFIERS ASSOCIATED WITH CONDITIONS FOR TEMPORARY USE

(71) Applicant: Fiserv, Inc., Brookfield, WI (US)

(72) Inventors: Carol Jackie Lucia Specogna, Bellingham, WA (US); Kevin Gilbert, Mukwonago, WI (US)

(73) Assignee: Fiserv, Inc., Brookfield, WI (US)

( * ) Notice: Subject to any disclaimer, the term of this patent is extended or adjusted under 35 U.S.C. 154(b) by 152 days.

(21) Appl. No.: 14/588,201

(22) Filed: Dec. 31, 2014

(65) Prior Publication Data

US 2016/0189123 A1    Jun. 30, 2016

(51) Int. Cl.
*G06Q 20/10* (2012.01)
*G06Q 20/40* (2012.01)
*G06Q 20/38* (2012.01)

(52) U.S. Cl.
CPC ....... *G06Q 20/1085* (2013.01); *G06Q 20/385* (2013.01); *G06Q 20/405* (2013.01)

(58) Field of Classification Search
CPC ............ G06Q 20/1085; G06Q 20/385; G06Q 20/405; G06Q 20/042; G06Q 20/045; G06Q 20/06; G06Q 20/387; G06Q 20/4012; G06Q 30/06
USPC ........................................................ 705/43
See application file for complete search history.

(56) References Cited

U.S. PATENT DOCUMENTS

| | | | | |
|---|---|---|---|---|
| 4,852,165 A | * | 7/1989 | Copella | G06Q 20/4012 705/72 |
| 5,331,141 A | * | 7/1994 | Kaneko | G06K 7/10851 235/375 |
| 5,628,023 A | * | 5/1997 | Bryant | G06F 12/145 711/207 |
| 6,035,290 A | * | 3/2000 | Pintsov | G07B 17/00435 705/405 |
| 6,081,895 A | * | 6/2000 | Harrison | G06F 21/72 380/28 |
| 6,212,504 B1 | * | 4/2001 | Hayosh | G06Q 20/042 235/375 |

(Continued)

OTHER PUBLICATIONS

NatWest, Helpful Banking, "Emergency Cash," http://www.natwestinternational.com/nw/personal-banking/current-accounts/g32/emergency-cash.ashx, Date accessed: Nov. 22, 2013.
NatWest, Helpful Banking, "NatWest Mobile Banking app," http://www.natwest.com/personal/online-banking/g2/mobile-phone-banking.ashx, Date accessed: Nov. 22, 2013.

(Continued)

*Primary Examiner* — Slade E Smith
(74) *Attorney, Agent, or Firm* — Alston & Bird LLP

(57) ABSTRACT

Systems, methods and computer-readable media are disclosed for providing a cardholder with a token corresponding to a card account identifier for temporary use in emergency situations in which an existing card account identifier has potentially been compromised, as a result of theft or loss of a transaction card or other potential misappropriation of the existing identifier, or situations in which the existing identifier is otherwise unavailable for use. The card account identifier for temporary use may be associated with conditions that restrict the manner and scope according to which the identifier may be used to gain access to funds. The token is provided to a funds dispensing system that is configured to construct the corresponding card account identifier from the token and initiate a financial transaction using the card account identifier.

19 Claims, 13 Drawing Sheets

(56) References Cited

U.S. PATENT DOCUMENTS

| | | | | |
|---|---|---|---|---|
| 6,791,588 | B1* | 9/2004 | Philyaw | G06Q 30/02 715/862 |
| 8,132,242 | B1* | 3/2012 | Wu | H04L 63/0884 726/8 |
| 8,290,868 | B2* | 10/2012 | Chenot | G06K 19/06196 705/41 |
| 8,417,017 | B1* | 4/2013 | Beutel | G06Q 20/042 382/135 |
| 8,429,116 | B2* | 4/2013 | Chen | G06F 16/283 707/600 |
| 8,437,528 | B1* | 5/2013 | Csulits | G07D 7/0047 382/135 |
| 8,632,000 | B2 | 1/2014 | Laracey | |
| 8,959,129 | B2* | 2/2015 | Wegener | G06F 7/483 708/203 |
| 2002/0013904 | A1* | 1/2002 | Gardner | G06Q 20/04 713/184 |
| 2002/0022966 | A1* | 2/2002 | Horgan | G06Q 20/342 705/35 |
| 2002/0090085 | A1* | 7/2002 | Vanstone | H04L 9/0869 380/44 |
| 2003/0069857 | A1 | 4/2003 | Junda | |
| 2005/0203857 | A1* | 9/2005 | Friedman | G07F 7/0833 705/78 |
| 2006/0173790 | A1* | 8/2006 | Park | G07B 15/063 705/13 |
| 2006/0287004 | A1* | 12/2006 | Fuqua | G06Q 20/0658 455/558 |
| 2007/0136167 | A1 | 6/2007 | Dilip et al. | |
| 2008/0222047 | A1* | 9/2008 | Boalt | G07F 7/10 705/67 |
| 2009/0006262 | A1* | 1/2009 | Brown | G06Q 20/4016 705/64 |
| 2009/0249082 | A1* | 10/2009 | Mattsson | G06F 21/6218 713/193 |
| 2009/0310778 | A1* | 12/2009 | Mueller | G06Q 20/3823 380/44 |
| 2010/0325441 | A1* | 12/2010 | Laurie | H04L 63/0815 713/185 |
| 2011/0154466 | A1* | 6/2011 | Harper | G06Q 20/34 726/9 |
| 2011/0213807 | A1* | 9/2011 | Mattsson | G07F 7/084 707/802 |
| 2012/0039469 | A1* | 2/2012 | Mueller | G06Q 20/12 380/252 |
| 2012/0101887 | A1* | 4/2012 | Harvey | G06Q 30/0241 705/14.23 |
| 2013/0013862 | A1* | 1/2013 | Kannan | A61B 5/7275 711/119 |
| 2013/0036048 | A1* | 2/2013 | Campos | G06Q 20/36 705/41 |
| 2013/0054469 | A1* | 2/2013 | Agashe | G06Q 20/4014 705/67 |
| 2013/0168450 | A1* | 7/2013 | von Mueller | H04L 9/0618 235/449 |
| 2013/0198071 | A1 | 8/2013 | Jurss | |
| 2013/0246274 | A1 | 9/2013 | Marcous et al. | |
| 2014/0040139 | A1* | 2/2014 | Brudnicki | H04W 12/0471 705/44 |
| 2014/0074724 | A1 | 3/2014 | Gordon et al. | |
| 2014/0108249 | A1* | 4/2014 | Kulpati | G06Q 20/16 705/44 |
| 2014/0143137 | A1* | 5/2014 | Carlson | G06Q 20/18 705/39 |
| 2014/0143146 | A1* | 5/2014 | Passanha | G06Q 20/3821 705/44 |
| 2014/0230029 | A1* | 8/2014 | Campagna | H04L 63/08 726/6 |
| 2014/0244485 | A1 | 8/2014 | Keenan et al. | |
| 2014/0258120 | A1* | 9/2014 | Specogna | G06Q 20/10 705/44 |
| 2015/0032627 | A1* | 1/2015 | Dill | H04L 9/32 705/44 |
| 2015/0046338 | A1* | 2/2015 | Laxminarayanan | G06Q 20/38215 705/67 |
| 2015/0095240 | A1 | 4/2015 | Specogna | |
| 2015/0178709 | A1 | 6/2015 | Keenan et al. | |
| 2015/0221149 | A1* | 8/2015 | Main | G06Q 20/322 340/5.61 |
| 2016/0019746 | A1* | 1/2016 | Lyons | G07F 17/3211 463/25 |
| 2016/0203352 | A1* | 7/2016 | Marsico | G16H 20/60 235/375 |

OTHER PUBLICATIONS

Howard, Bob, "NatWest suspends Get Cash app," BBC News Business, Oct. 6, 2012.

NatWest, Helpful Banking, "Mobile Banking—video transcript," http://www.natwest.com/personal/online-banking/g2/mobile-phone-banking/video-transcript.ashx, Date accessed: Nov. 22, 2013.

* cited by examiner

CARD ACCOUNT IDENTIFIERS ASSOCIATED WITH CONDITIONS FOR TEMPORARY USE

BACKGROUND

Account identifiers typically include a string of numeric digits and are used to obtain access to funds that may be held in or associated with any of a number of types of financial accounts such as demand deposit accounts, savings accounts, money market accounts, credit card accounts, stored-value accounts, and so forth. Such account identifiers may be encoded in any of a variety of machine-readable formats such as, for example, in a magnetic stripe provided on a payment card or a funds access card such as an Automated Teller Machine (ATM) card. Often, a physical representation of an account identifier may be printed on or otherwise affixed to a payment or funds access card for identification purposes. A financial account holder or other authorized user may often be required to provide authentication credentials such as a Personal Identification Number (PIN) in connection with use of a payment or funds access card in order to obtain access to funds.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar or identical components; however, different reference numerals may be used to identify similar or identical components as well. Various embodiments may utilize element(s) and/or component(s) other than those illustrated in the drawings and some element(s) and/or component(s) may not be present in various embodiments. The use of singular terminology to describe a component or element may, depending on the context, encompass a plural number of such components or elements and vice versa.

DETAILED DESCRIPTION

Overview

Figure 1:
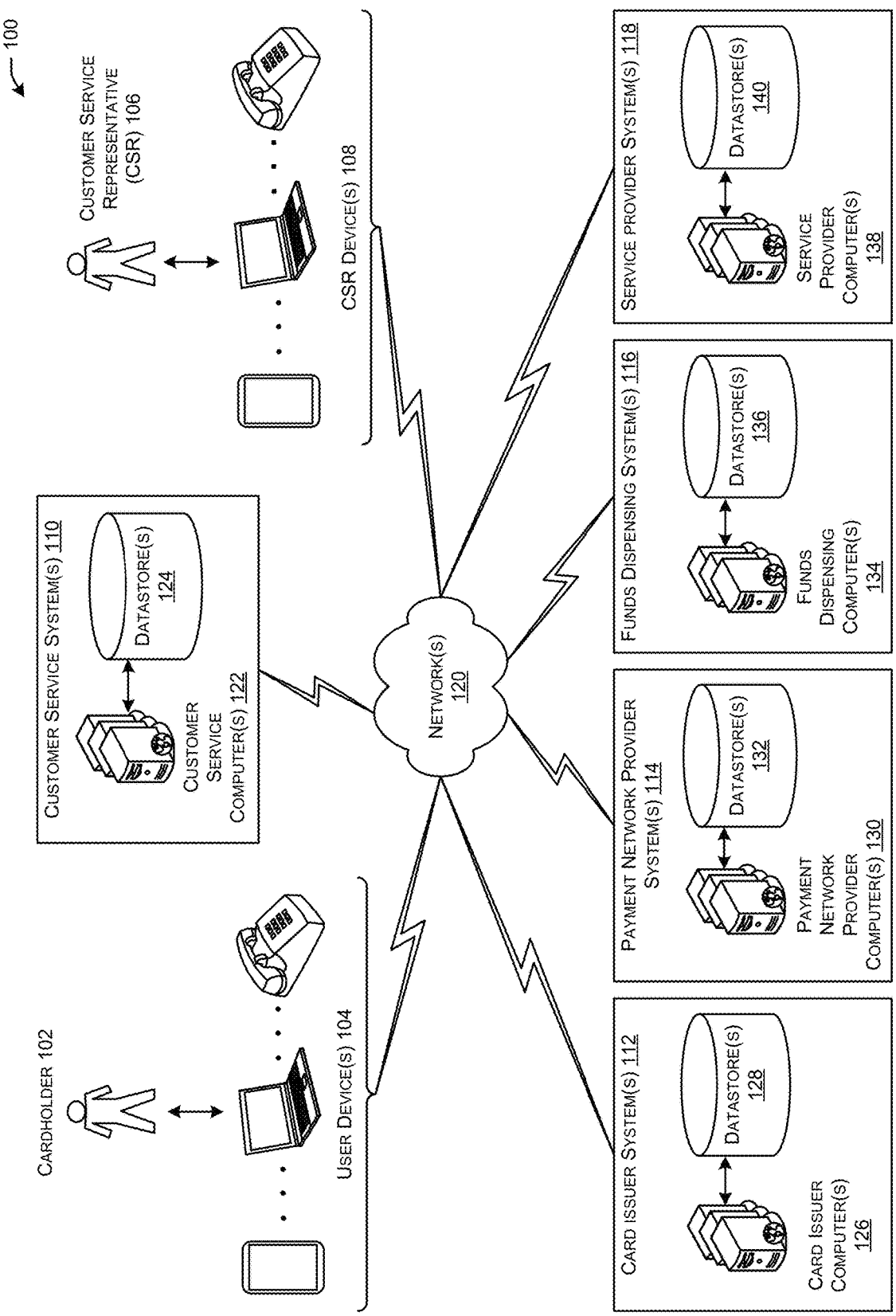
FIG. 1 is a schematic block diagram of an illustrative architecture in accordance with one or more example embodiments of the disclosure that facilitates the establishment of conditions for temporary use of card account identifiers and the use of such card account identifiers in accordance with the conditions for temporary use in order to obtain access to funds.

Embodiments of the disclosure relate to, among other things, systems, methods, computer-readable media, techniques and methodologies for establishing conditions for temporary use of a card account identifier and providing a cardholder or other authorized user with access to funds held in a financial account associated with the cardholder when the conditions for temporary use of the card account identifier are determined to be satisfied.

Processing to establish conditions for temporary use of a card account identifier may be initiated responsive to a cardholder communication indicating a desire to receive such a card account identifier, an automated determination, or the like. In various example embodiments of the disclosure, such processing may be initiated under circumstances in which an existing card account identifier is believed to be potentially compromised or unavailable for use. In such circumstances, a block may be applied to an existing card account identifier precluding further use of the existing card account identifier, and processing to generate a new permanent card account identifier may be initiated.

A delay typically exists between when a block to an existing card account identifier is applied and when a payment or funds access card encoding the new permanent card account identifier is received by the cardholder. During this delay period, the cardholder may experience urgent, emergency, or otherwise time-sensitive situations requiring funds access which was previously (and is now no longer) enabled by the existing card account identifier. Accordingly, establishment of conditions for temporary use of a card account identifier provides a cardholder with immediate access to the funds without requiring the cardholder to await receipt of a payment card or funds access card that encodes the new permanent card account identifier. Further, the conditions for temporary use of the card account identifier may restrict the manner and time period over which the associated card account identifier may be used to access the funds so as to mitigate risk in the interim until the payment card or funds access card encoding the new permanent card account identifier is received and activated.

As used herein, establishing conditions for temporary use of a card account identifier may refer to processes for determining the conditions for temporary use of the card account identifier based on an analysis of any of a variety of types of data with respect to one or more rules and associating the conditions with the card account identifier such that use of the card account identifier may be restricted to scenarios in which the conditions are determined to be satisfied. Conditions for temporary use may refer to use conditions that restrict the circumstances under which a financial transaction may be enabled by the associated card account identifier such that when the use conditions are longer satisfied, the card account identifier no longer provides access to funds associated with a financial account. Illustrative conditions for temporary use of a card account identifier may include, but are not limited to, a time limit for use of the card account identifier, a total funds withdrawal or transaction amount limit, a number of separate transactions permitted using the card account identifier, a per-transaction funds withdrawal or transaction amount limit, a geographic constraint as to where the card account identifier may be used, a constraint as to which funds dispensing system(s) in connection with which the card account identifier may be used, and so forth.

As will be described in more detail hereinafter, the card account identifier for which conditions for temporary use may be established may be an existing card account identifier, a new temporary card account identifier, a new permanent card account identifier, or any other suitable card account identifier. Accordingly, in certain example embodiments, establishing conditions for temporary use of a card account identifier may further encompass generation of a temporary card account identifier and establishment of conditions for temporary use of the temporary card account identifier or generation of a new permanent card account identifier and establishment of initial conditions for temporary use of the new card permanent card account identifier. Initial conditions for temporary use that are associated with a new permanent card account identifier may be eliminated responsive to full activation of the new card account identifier such as, for example, upon cardholder receipt and activation of a payment or funds access card encoding the new card account identifier. Accordingly, the phrases "establishing a card account identifier for temporary use" and "establishing conditions for temporary use of a card account identifier," or variations thereof, may be used interchangeably herein, and may or may not, depending on the context, include generation of a new card account identifier either in the form of a temporary card account identifier or a new permanent card account identifier.

It should be appreciated that the term "card account identifier" as used herein may refer to an identifier having any suitable form that facilitates identification of one or more financial accounts with which the card account identifier is associated and access to funds held in or otherwise associated with such financial account(s). A card account identifier may be encoded in a physical payment or funds access card usable by a cardholder to conduct financial transactions involving financial account(s) to which the card account identifier is linked. However, it should be appreciated that in certain example embodiments of the disclosure, a card account identifier may not be associated with a physical payment or funds access card that encodes the identifier (e.g., a temporary card account identifier as described herein).

In addition, in certain example embodiments, a token that corresponds to a card account identifier associated with conditions for temporary use may be generated. The token may be shorter in length than the corresponding card account identifier that is associated with conditions for temporary use (e.g., the token may include a lesser number of numeric digits than the card account identifier). In addition, in certain example embodiments, the token may include a broader character set than the corresponding card account identifier. For example, in addition to numeric characters, the token may include non-numeric characters such as letters, special characters, or other non-numeric symbols. As will be described in more detail hereinafter, the token may be provided to an account holder in lieu of or in addition to the temporary use card account identifier, enabling the account holder to provide the token instead of the temporary use card account identifier in order to obtain funds from a corresponding financial account. The corresponding card account identifier may be constructed from the token using token transformation logic. In this manner, the risk that the account holder provides an incorrect identifier while attempting to obtain funds from a corresponding financial account—which is more likely with the typically longer temporary use card account identifier than the typically shorter or more easily remembered token—is mitigated.

A card account identifier may provide access to funds associated with any of a variety of types of financial accounts. As used herein, the term "financial account" may refer to any collection of funds available for use by an account holder of the financial account and may include, without limitation, a demand deposit account, a savings account, a brokerage account, a credit card account, a line of credit, a stored-value account, and so forth.

Access to available funds may be provided via a payment card (e.g., a debit card) or a funds access card (e.g., an ATM card that provides funds withdrawal functionality but not payment functionality) that encodes the card account identifier. In other example embodiments, the card account identifier may be associated with a credit card account or a line of credit and may provide access to available funds associated with the credit card account or line of credit via a credit card or other suitable payment card. In yet other example embodiments, the card account identifier may be associated with a stored-value account and may provide access to funds associated with the stored-value account via a pre-paid payment card or the like. In any of the above scenarios, a card account identifier and a payment or funds access card that encodes the card account identifier may be issued by a card issuer with which the associated financial account is held and may be branded by a card association or other entity that operates a payment network capable of accepting, routing, and processing financial transactions involving the financial account.

In accordance with one or more example embodiments of the disclosure, automated processing for establishing the conditions for temporary use of a card account identifier may be initiated responsive to receipt of a request for the card account identifier on behalf of a cardholder (or other authorized user). It should be noted that throughout this disclosure, reference to a cardholder includes an implicit reference to a user authorized by the cardholder to access funds held in or otherwise associated with one or more financial accounts of the cardholder unless the context of the discussion indicates otherwise.

In certain example embodiments, the processing for establishing the card account identifier for temporary use may be triggered responsive to a communication received from the cardholder indicating a desire on the part of the cardholder to receive such a card account identifier. The cardholder communication may be received, for example, by a customer service representative (CSR) or an automated customer service system operating on behalf of the card issuer. The cardholder communication may occur via telephone interaction, Web-based interaction, or the like.

Any of a variety of scenarios may trigger the cardholder communication. For example, in certain scenarios, a cardholder may initiate the communication after determining that an existing card account identifier has been potentially compromised due to loss or theft of a payment card or funds access card that encodes the card account identifier or due to other forms of potential misappropriation of the card account identifier that may not involve loss or theft of a card.

In certain other example scenarios, an automated system hosted by or on behalf of an issuer of the card account identifier may determine that the card account identifier has potentially been compromised based on an analysis of transaction history with respect to one or more fraud detection/mitigation rules, and may initiate communication with the cardholder, responsive to which the cardholder may indicate a desire to have a card account identifier for temporary use established.

In yet other example scenarios, while a card account identifier may not be at risk of being potentially compromised, the card account identifier may simply be unavailable for use by the cardholder. For example, a cardholder may be traveling without access to a payment or funds access card that he/she may have left at home and may accordingly submit a request for a card account identifier for temporary use.

It should be appreciated that any reference herein to scenarios in which a card account identifier has potentially been compromised implicitly includes a reference to scenarios in which the card account identifier is unavailable for use, and vice versa. It should further be appreciated that the above examples are merely illustrative and that example embodiments of the disclosure may be applicable to any scenario in which a card account identifier may be potentially compromised or unavailable for use.

In certain example embodiments, a cardholder request for a card account identifier for temporary use may be received in conjunction with a request to apply a block to an existing card account identifier and to generate a new card account identifier. For example, in various embodiments, such as those in which a cardholder determines that an existing card account identifier has potentially been compromised, a communication received from the cardholder may indicate a desire to apply a block to the existing card identifier and to generate a new permanent card account identifier as well as a desire to receive a card account identifier for temporary use. In such a scenario, processing to apply a partial or complete block to the existing card account identifier and to generate a new card account identifier as well as processing to establish a card account identifier for temporary use (which may be, for example, the existing card account identifier, a new temporary card account identifier, or the new permanent card account identifier) may be initiated at least partially concurrently or in relative temporal proximity to one another responsive to the cardholder communication.

In other example embodiments, processing to apply a block to an existing card account identifier and to generate a new card account identifier may be initiated first without triggering the initiation of processing to establish a card account identifier for temporary use. For example, processing to apply a block to an existing card account identifier and to generate a new card account identifier may be initiated responsive to a cardholder communication indicating that the existing card account identifier has been potentially compromised; however, the cardholder communication may indicate no desire on the part of the cardholder to receive a card account identifier for temporary use. A subsequent cardholder communication may then be received indicating a desire to receive a card account identifier for temporary use and such a card account identifier may be established responsive to this subsequent communication.

In still other example embodiments, processing to apply a block to an existing card account identifier and to generate a new permanent card account identifier may be initiated responsive to an automated determination that an existing card account identifier has potentially been compromised. This automated determination may be based, for example, on an analysis of transaction activity with respect to one or more fraud detection/mitigation rules. A subsequent cardholder communication may then be received that indicates a desire on the part of the cardholder to receive a card account identifier for temporary use. This subsequent cardholder communication may be received responsive to a message or other indication communicated by a CSR or automated customer service system informing the cardholder of the initiation of the block based on potentially fraudulent activity. In other example embodiments, this subsequent cardholder communication may be received responsive to an independent determination by the cardholder that the block has been initiated based, for example, on failed use of the existing card account identifier. In still other example embodiments, processing to establish a card account identifier for temporary use may be automatically initiated responsive to a determination (automated or via a cardholder communication) that an existing card account identifier has potentially been compromised. Such processing may be automatically triggered based on stored preferences previously specified by the cardholder.

In certain example embodiments, a block applied to an existing card account identifier based on an analysis of transaction activity may be an initial block that does not automatically trigger initiation of processing to generate a new permanent card account identifier. Rather, after application of the block, a CSR or automated customer service system may initiate communication with the cardholder to determine whether the transaction activity is truly fraudulent in nature, and based on the response received from the cardholder, the block may be removed or the block may be made permanent and the new card account identifier may be generated.

Upon establishment of a card account identifier for temporary use, whether in the form of an existing card account identifier, a newly generated temporary card account identifier, or a newly generated permanent card account identifier, an indication of the card account identifier may be conveyed to the cardholder. In certain example embodiments, the card account identifier may be presented to the cardholder via telephone interaction with a CSR or an automated customer service system. In other example embodiments, a representation of the card account identifier may be transmitted for presentation to the cardholder. The representation of the card account identifier may include, for example, a string of characters directly indicative of the card account identifier; a barcode, Quick Response (QR) code, or the like that encodes the card account identifier; or any other suitable type of representation. The representation of the card account identifier may be transmitted through an in-session, Web-based interaction with the cardholder or through a non-synchronous interaction such as in an electronic mail (e-mail) message or a Short Message Service (SMS) message.

In addition, in certain example embodiments, a token corresponding to the card account identifier for temporary use may also be generated. More specifically, upon establishing the temporary use card account identifier, whether in the form of an existing card account identifier, a newly generated temporary card account identifier, or a newly generated permanent card account identifier, the customer service system may generate a token corresponding to the temporary use card account identifier in an automated fashion or in response to input received from, for example, a CSR. Generation of the token may include substituting a corresponding character string, which may comprise a fewer number of characters (e.g., a single numeric character) for a first set of numeric characters of the temporary use card account identifier. A mapping of a portion of the token (e.g., a token segment) to a corresponding portion of the temporary use card account identifier may be stored at the customer service system in, for example, a database table or any other suitable data structure. Further, the mapping may be provided to one or more other systems such as, for example, a funds dispensing system to enable transformation of the token to the corresponding temporary use card account identifier that is recognizable by a service provider system, payment network provider system, card issuer system, or the like. In this manner, the account holder may utilize the token to obtain funds without needing to have knowledge of the associated temporary use card account identifier, while back-end payment processing systems may continue to operate with the associated temporary use card account identifier.

It should be appreciated that any discussion herein regarding use of a temporary use card account identifier by an account holder to obtain funds also applies to use of a token by the account holder to obtain funds. It should further be appreciated that the mapping of the token segment to the corresponding portion of the temporary use card account identifier may be provided as part of computer-executable code, instructions, or the like that responsive to execution cause a data structure (e.g., a character array) representative of the temporary use card account identifier to be generated from a data structure (e.g., a character array) representative of the corresponding token using the mapping. The mapping may be represented in the computer-executable code using any suitable data structure (e.g., a string array) that assigns a value (e.g., a character string representative of the numeric digits of the portion of the temporary use card account identifier) to an index of the data structure representative of the mapping. In certain example embodiments, the first character of a valid token may correspond to a particular index of the data structure representative of the mapping, and this correspondence may be used to determine the value at that particular index, which as noted above, may be a character string representative of the numeric digits of the portion of the temporary use card account identifier that corresponds to that token. The data structure representative of the temporary use card account identifier may then be populated with the determined character string. In other example embodiments, the mapping between token segments and corresponding portions of card account identifiers may be represented in the computer-executable code using other types of data structures, where each element of the data structure is, for example, a 2-tuple containing a particular token segment and a corresponding portion of a card account identifier. It should be appreciated that the example types of data structures discussed above (and discussed herein generally) are provided merely by way of illustration and are not intended to be limiting in any way.

Instructional information providing instructions for temporary use of the card account identifier may also be communicated to the cardholder. The instructional information may include, but is not limited to, an indication of the conditions that govern temporary use of the card account identifier, instructions for generating authentication credentials (e.g., a PIN) for enabling use of the card account identifier, an indication of one or more funds dispensing locations at which the card account identifier may be used to obtain access to funds, and so forth.

The funds dispensing locations may include, but are not limited to, an ATM location, a point-of-sale (POS) location, a financial institution branch, or the like. A respective funds dispensing system may be present at or otherwise associated with each funds dispensing location. For example, an ATM machine may be present at an ATM location and may be configured to receive the card account identifier and provide access to funds responsive to a determination that associated conditions for temporary use of the card account identifier are satisfied. Similarly, a POS device may be present at a POS location such as a retail merchant location and may be configured to enable access to funds using the card account identifier. As another non-limiting example, a cardholder may visit a designated financial institution branch and provide the card account identifier to a teller who may, in turn, input the account identifier to a funds dispensing system present at the branch in order to enable access to funds responsive to a determination that associated conditions for temporary use of the card account identifier are satisfied. It should be appreciated that the above examples of funds dispensing locations and associated systems are merely illustrative and not exhaustive.

In any of the above scenarios, prior to initiating processing to determine whether conditions for temporary use are satisfied, the funds dispensing system may first receive input indicating that a received card account identifier is an account identifier associated with conditions for temporary use. Such input may, in various example embodiments, correspond to user input provided to a user interface (e.g., a touch display, a push-button interface, etc.) of the funds dispensing system. The user may be the cardholder herself or a proxy for the cardholder such as an authorized user of the card account identifier or a financial institution teller. The user input may be indicative of a user selection of a selectable option to use a card account identifier associated with conditions for temporary use. An indication of the selectable option may be presented to the user via the user interface. In other example embodiments, the funds dispensing system may be configured to determine that the card account identifier that is received is one that is associated with conditions for temporary use based, for example, on the account identifier itself. For example, if the card account identifier is a new temporary card account identifier, a particular combination of characters may be included in the account identifier that indicates that the account identifier is associated with conditions for temporary use.

Similarly, a funds dispensing system associated with a funds dispensing location may be configured to receive user input indicative of a token corresponding to a card account identifier, construct the corresponding card account identifier from the token, and provide access to funds responsive to a determination that associated conditions for temporary use of the card account identifier are satisfied. The user input may be received via an input/output (I/O) interface of the funds dispensing system, or more specifically, via an I/O interface of an ATM, POS device, or similar device of the funds dispensing system. The I/O interface may include, without limitation, a touch-sensitive panel of an ATM, POS device, or similar device that enables entry of user input via touch-based interactions with the touch-sensitive panel; a physical keypad and/or other selectable physical buttons of such a device that enables entry of user input via actuation of the physical buttons; a microphone configured to provide voice prompts and receive voice commands; a wireless network interface such as a Bluetooth interface, a Near-Field Communication (NFC) interface, a Wi-Fi interface, or the like that enables receipt of radio frequency (RF) signals from a mobile device that are indicative of the token; and so forth.

In certain example embodiments, a user may be required to provide initial user input to the funds dispensing system to indicate a desire to provide token input data to the system. For example, an I/O interface of the funds dispensing system may provide a selectable option that a user may select to inform the system that a token will be provided as user input as opposed to, for example, swiping a physical card using a magnetic card reader of the funds dispensing system. In certain example embodiments, a first selectable option may be provided for indicating that a token will be provided and a second selectable option may be provided for indicating that a temporary use card account identifier will be provided. In other example embodiments, a single selectable option may be provided for indicating that user input corresponding to a temporary use card account identifier or a token will be provided, and the funds dispensing system may be configured to determine that the user input is indicative of a token as opposed to a temporary use card account identifier. For example, the funds dispensing system may be able to distinguish a token from a card account identifier because the token may be of a broader character set than a card account identifier and/or may be of a different length than a standard length of a card account identifier. For example, the token may be an 11-digit numeric identifier while the temporary use card account identifier may be a standard 16-digit account identifier. In certain example embodiments, the token may be provided to the funds dispensing system via entry of the characters of the token using an I/O interface (e.g., a touch panel, a physical keypad, etc.) of an ATM, POS device, or other device of the funds dispensing system. In other example embodiments, the token may be provided in the form of audible input. In still other example embodiments, an ATM, POS device, or other computing device of the funds dispensing system may include or may be in communication with a scanner, reader, or the like that is configured to read a representation of the token such as, for example, a character string, a barcode, a QR code, or the like that encodes the token. In yet other example embodiments, the token may be received by the funds dispensing system from a mobile device via a Bluetooth, NFC, Wi-Fi, or other network interface.

(e.g., The funds dispensing system may execute token transformation logic (e.g., computer-executable instructions, code, or the like) to store the user input representative of the token in a token data structure, determine a first segment of the token (e.g., a first character of the token), store a portion of the token in a card account identifier data structure (e.g., a portion of the token that excludes the first token segment), determine a card account identifier portion corresponding to the first token segment using, for example, a stored mapping or a mapping included in the token transformation logic that maps token segments to corresponding portions of card account identifiers, and store the card account identifier portion in the card account identifier data structure. In this manner, a complete temporary use card account identifier may be constructed from the token and stored in the card account identifier data structure. The funds dispensing system may then communicate the card account identifier constructed from the token to one or more external systems as part of a request to determine whether conditions for temporary use of the card account identifier are satisfied, as described in more detail below.

As alluded to above, in any of the above scenarios, the funds dispensing system present at the funds dispensing location may be configured to communicate with one or more external systems (e.g., a card issuer system, a service provider system, a customer service system, etc.) in order to determine whether the conditions for temporary use of the card account identifier are satisfied. For example, the funds dispensing system may generate and submit a request to one or more external systems to determine whether the conditions for temporary use are satisfied. The request may include an indication of a received card account identifier (or a card account identifier constructed from a received token), and may optionally further include identifying information associated with the funds dispensing location (e.g., an address of the funds dispensing location, an indication of the type of funds dispensing location, etc.) and/or an indication of the associated conditions for temporary use. In other example embodiments, the funds dispensing system may store data indicative of the conditions for temporary use as well as historical transaction data associated with the card account identifier, and thus, may be configured to make the determination locally.

In accordance with one or more example embodiments of the disclosure, the funds dispensing location(s) at which the cardholder may be authorized to use the card account identifier to gain access to funds may be determined based on a location of the cardholder and one or more location determination rules. The cardholder's location may be identified in any number of suitable ways including, but not limited to, based on a Global Positioning System (GPS) location received from a user device operable by the cardholder or based on location information received on behalf of the cardholder in response to a location inquiry. For example, a cardholder may provide his/her location via a Web-based, telephone-based, or similar interaction session. Further, varying levels of precision may be specified for the cardholder's location. For example, as noted earlier, the cardholder's location may correspond to GPS coordinates of a user device operable by the cardholder or a complete street address specified by the cardholder, or in other example embodiments, may be a less precise location identifier such as a postal code (e.g., a zip code), city name, neighborhood identifier, or the like.

Upon identification of a suitable cardholder location, one or more funds dispensing locations may be identified based on various location determination rules. An illustrative location determination rule may be, for example, a rule that specifies that a funds dispensing location must be within a threshold distance from the cardholder's location in order to be a candidate for use by the cardholder to obtain access to funds using a card account identifier associated with conditions for temporary use. The threshold distance may be determined in an automated manner or may be based on a cardholder-specified preference.

Another illustrative location determination rule may be, for example, a rule that specifies that funds dispensing locations associated with only certain types of funds dispensing systems are candidate locations for use. For example, a location determination rule may specify that only ATM or POS funds dispensing locations are available for use by the cardholder. Such an illustrative location determination rule may be established based on any of a variety of types of factors including, but not limited to, historical transactional activity or transactional patterns associated with the cardholder, funds dispensing capabilities of various funds dispensing locations, risk assessments associated with the cardholder, and so forth. It should be appreciated that the above examples of location determination rules are merely illustrative and not exhaustive.

Upon receipt of the card account identifier for temporary use (or a corresponding token) and the instructional information, a cardholder may visit any of the funds dispensing locations identified in the instructional information in order to obtain access to funds using the card account identifier. As previously noted, a funds dispensing system present at or otherwise associated with a funds dispensing location visited by a cardholder may be configured to receive a card account identifier associated with conditions for temporary use, identify the received card account identifier as an identifier associated with conditions for temporary use, initiate processing to determine whether the conditions for temporary use are satisfied, and provide the cardholder with access to funds responsive to a determination that the conditions are satisfied. Further, in certain example embodiments, the funds dispensing system may be configured to receive a token, identify the token as corresponding to a card account identifier associated with conditions for temporary use, construct the card account identifier from the token using a mapping of token segments to portions of card issuer identifiers, initiate processing to determine whether the conditions for temporary use are satisfied, and provide the cardholder with access to funds responsive to a determination that the conditions are satisfied. In certain example embodiments, the cardholder may need to be authenticated based on authentication credentials (e.g. a PIN, an answer to a secret question, etc.) prior to initiating the processing to determine whether the conditions for temporary use are satisfied.

In various example embodiments, access to funds may be provided in the form of currency dispensed to the cardholder. In certain example embodiments, such as those in which the funds dispensing location is a POS location, access to funds may be provided in the form of a payment for a transaction executed on behalf of the cardholder. Depending on the type of financial account with which the card account identifier is associated, funds in an amount equal to the amount dispensed or a purchase amount may be debited from the financial account or an equivalent charge may be made to the financial account such as in the case of a credit card account. In various example embodiments, a transaction fee may be assessed to the cardholder for the cash withdrawal or purchase made using the card account identifier associated with temporary use.

Processing for applying a block to an existing card account identifier, generating a new permanent card account identifier, and/or establishing a card account identifier associated with conditions for temporary use may be performed, at least in part, by one or more systems hosted by a same entity that may either receive a communication from a cardholder requesting such actions or that may otherwise cause such actions to be triggered based on automated fraud detection processing. In other example embodiments, one or more systems hosted by a different entity may perform at least some of the above-described processing such as, for example, processing to establish a card account identifier for temporary use. As a non-limiting example, the cardholder may communicate with a CSR of a customer service provider (e.g., the card issuer, another entity to whom customer service related tasks are outsourced, etc.), and the CSR may, in turn, interact with a customer service system to generate and submit a request to a service provider system to establish a card account identifier for temporary use. In other example embodiments, the customer service system may perform at least a portion of the functionality for establishing the card account identifier for temporary use. Similarly, in certain example embodiments, the customer service system and/or service provider system may perform at least a portion of the processing for applying a block to an existing card account identifier and generating a new permanent card account identifier.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Architecture

FIG. 1 is a schematic block diagram of an illustrative architecture 100 in accordance with one or more example embodiments of the disclosure. The illustrative architecture 100 may be configured to facilitate the establishment of conditions for temporary use of card account identifiers and the use of such card account identifiers in accordance with the conditions for temporary use in order to obtain access to funds in situations in which such access would otherwise be unavailable.

The illustrative architecture 100 may include one or more user devices 104 operable by one or more cardholders (or other authorized users) 102, one or more CSR devices 108 operable by one or more CSRs 106, one or more customer service systems 110, one or more card issuer systems 112, one or more payment network provider systems 114, one or more funds dispensing systems 116, and one or more service provider systems 118. It should be appreciated that while one or more components of the illustrative architecture 100 and/or associated entities may be described in the singular herein, a plural number of any such component(s) and/or entities is also encompassed within any of the example embodiments of the disclosure. Further, any functionality described herein as being supported by a particular system, device or component may, in various example embodiments, be distributed among a plural number of instances such systems, devices or components, or among a plural number of different systems, devices or components. In addition, functionality or processing described herein as being supported or performed by a particular system may be supported or performed, at least in part, by one or more computers forming part of the system.

The cardholder(s) 102 may include any individual or entity authorized to use a payment or funds access card that provides access to one or more financial accounts having financial value. The payment or funds access card may provide a cardholder with the capability to purchase goods or services or obtain cash funds based on the financial value of an associated financial account. As previously noted, a financial account to which a payment or funds access card provides access may include, without limitation, a demand deposit account, a savings account, a brokerage account, a credit card account, a line of credit, a stored-value account, and so forth.

The user device(s) 104 and the CSR device(s) 108 may include any suitable communications device that provides voice and/or data communications capabilities including, but not limited to, any suitable mobile computing device such as, for example, a smartphone device, a tablet device, or the like; any suitable desktop or laptop computing device; any suitable telephonic device; and so forth. In various example embodiments, a cardholder 102 may utilize a user device 104 to communicate with a CSR 106 using a CSR device 108 in order to, for example, report an existing card account identifier as potentially compromised or unavailable for use and to initiate processing to apply a block to the existing card account identifier and generate a new permanent card account identifier and/or processing to establish a card account identifier for temporary use. A CSR 106 may utilize one or more CSR devices 108 to field incoming calls/requests from cardholders 102 and/or to access other system(s) (e.g., the customer service system 110, the card issuer system 112, the service provider system 118, etc.) to access/update cardholder information, to submit requests for processing associated with cardholder accounts, and so forth. In certain example embodiments, a CSR 106 may utilize a first type of CSR device 108 (e.g. a telephonic device) to interact with a cardholder 102 and a second type of CSR device 108 (e.g., a personal computing device) to access system functionality.

In other example embodiments, a cardholder 102 may utilize a user device 104 to communicate with a CSR 106 responsive to receipt of a prior or current communication on behalf of a CSR 106 or from an automated system indicating that an existing card account identifier has been potentially compromised or upon receipt of an automated message indicating the same. For example, a cardholder 102 may utilize a user device 104 having voice communications capabilities to interact with a CSR 106 via a corresponding CSR device 108. As another non-limiting example, a cardholder 102 may utilize an instant messaging application executable on a user device 104 (e.g., a chat window of an instant messaging session) to communicate with a CSR 106 via a corresponding instance of the instant message application executing on a CSR device 108.

In various example embodiments, the user device(s) 104 may be configured to execute a client application (e.g., a dedicated thin-client application, a Web-based application accessible via a Web browser, a dedicated mobile application, etc.) via which a cardholder 102 may interact with a corresponding server-side application executing on any of the illustrative systems of the architecture 100 (e.g., the customer service system 110). The cardholder 102 may utilize such a client application to access automated server-side functionality for initiating processing to apply a block to an existing card account identifier and generate a new permanent card account identifier and/or processing to establish a card account identifier for temporary use.

Each of the above-described systems forming part of the architecture 100 may include a respective one or more computers and a respective one or more datastores. For example, the customer service system 110 may include one or more customer service computer(s) 122 and one or more datastores 124. Similarly, the card issuer system 112 may include one or more card issuer computers 126 and one or more datastores 128, the payment network provider system 114 may include one or more payment network provider computers 130 and one or more datastores 132, the funds dispensing system 116 may include one or more funds dispensing computers 134 and one or more datastores 136, and the service provider system 118 may include one or more service provider computers 138 and the one or more datastores 140. For any illustrative system (e.g., the service provider system 118) forming part of the architecture 100, at least one of the computer(s) may be communicatively coupled to at least one of the datastore(s) in order to facilitate the storage and retrieval of data therefrom.

The computers of any of the illustrative systems of the architecture 100 may include any suitable computing device including, but not limited to, a server computer, a mainframe computer, a workstation, a desktop computer, a laptop computer, and so forth. Further, the datastores may include any suitable data repository including, but not limited to, databases (e.g., relational, object-oriented, etc.), file systems, flat files, distributed datastores in which data is stored on more than one node of a computer network, peer-to-peer network datastores, or the like. Any of the datastores may represent data in one or more data schemas.

Any two or more of the illustrative components of the architecture 100 may be configured to communicate with one another via respective communicative couplings to one or more networks 120. The network(s) 120 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the network(s) 120 may have any suitable communication range associated therewith and may include, for example, global networks (e.g., the Internet), metropolitan area networks (MANs), wide area networks (WANs), local area networks (LANs), or personal area networks (PANs). In addition, the network(s) 120 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

A card issuer system 112 may be hosted, managed, controlled by, or otherwise associated with a card issuer that holds financial accounts on behalf of cardholders 102. The card issuer may be a financial institution, but need not be. The card issuer may issue a payment or funds access card for a financial account that permits a cardholder 102 to gain access to funds held in or otherwise associated with the financial account. The card issuer system 112 may be configured to support a variety of functionality in connection with the management of financial accounts of cardholders 102. Such functionality may include, for example, core account processing functionality for managing financial accounts (e.g., debiting and crediting financial accounts, regulating transaction activity, etc.); card services functionality (e.g., customer service functionality, card issuance processing, fraud detection/mitigation processing, processing for establishing a card account identifier for temporary use, etc.); ATM/POS functionality; debit/credit network gateway functionality; and so forth. In example embodiments of the disclosure, any portion of the functionality described above as being supported by the card issuer system 112 may be outsourced to third parties that operate one or more other systems of the architecture 100. For example, in certain example embodiments, a third-party organization employing the CSRs 106 may be tasked with providing customer service support for a card issuer. For example, a CSR 106 may utilize a CSR device 108 (e.g., a computing device executing a client application) to communicate with the card issuer system 112 (e.g., server-side application(s) executing on one or more card issuer computers 126) to initiate processing associated with customer service functionality such as card services functionality.

In certain other embodiments, other systems such as the customer service system 110 and/or the service provider system 118 (which may be operated by or otherwise associated with an entity contracted by the card issuer) may support various card services related functionality on behalf the card issuer. Such card services related functionality may include fraud detection/mitigation processing to determine whether a card account identifier has been potentially compromised, processing to apply a block to an existing card account identifier, processing to initiate generation of a new permanent account identifier and/or mailing of a payment or funds access card encoding the new permanent account identifier, and/or processing to establish a card account identifier for temporary use. In such embodiments, a CSR 106 may utilize a CSR device 108 to communicate with the customer service system 110 and/or the service provider system 118 to order to initiate such processing. In other example embodiments, a cardholder 102 may utilize a user device 104 to interact directly with the customer service system 110 and/or the service provider system 118. It should be appreciated that the above examples of the distribution of functionality between various systems/components of the architecture 100 are merely illustrative and not exhaustive.

In addition, in certain example embodiments, card services functionality supported by the customer service system 110 and/or the service provider system 118 may include functionality for generating a token corresponding to a card account identifier associated with conditions for temporary use. For example, a CSR 106 may utilize a CSR device 108 (e.g., a computing device executing a client application) to communicate with the customer service system 110 and/or the service provider system 118 to initiate generation of the token. In other example embodiments, the customer service system 110 and/or the service provider system 118 may automatically initiate the process for generating the token upon generation of the corresponding temporary use card account identifier. The token may be generated by replacing a portion of the card account identifier with a corresponding token segment. The portion of the card account identifier that is replaced may be, for example, an identifier (e.g., a Banking Identification Number (BIN)) of a particular card issuer or payment network. The token segment that is substituted for the portion of the card account identifier may include one or more characters that represent, for example, a BIN index of the corresponding BIN. Referring now to other illustrative parts of the architecture 100, a payment network provider may support one or more payment networks and may operate or direct the operation of one or more payment network provider systems 114 to enable connectivity across the payment network(s) between any of a variety of entities. A payment network may include any suitable electronic network for financial transactions including, but not limited to, a debit network (e.g., Accel™, STAR™, Pulse™, NYCE™, etc.), a credit network, a proprietary network of financial institutions, an Automated Clearinghouse (ACH) network, and so forth. The payment network system(s) 114 of a particular payment network may support connectivity—via one or more of the network(s) 120—among card issuers associated with the payment network; between a card issuer associated with the payment network and a card issuer that is not associated with the payment network (via one or more other payment networks); among any of a variety of ATM, POS, financial institution, and/or service provider system(s) and card issuers associated with the payment network; and so forth. Messages communicated across a payment network may be in accordance with any suitable communications protocol such as, for example, the International Standards Organization (ISO) 8583 protocol.

As previously noted, systems other than a card issuer system 112 (e.g., a customer service system 110, a service provider system 118, etc.) may support functionality for performing automated fraud detection/mitigation processing, applying a block to an existing card account identifier, generating a new permanent card account identifier, initiating a process for mailing a payment or funds access card encoding the new permanent card account identifier, establishing a card account identifier for temporary use, and/or generating a token corresponding to the card account identifier for temporary use. In such embodiments, information that identifies an existing card account identifier and that further indicates that a block has been applied to the existing card account identifier and/or information indicative of a new permanent card account identifier generated in lieu of use of the existing card account identifier may be transmitted to a card issuer system 112 via a payment network with which the card issuer is associated, or more specifically, via one or more payment network provider systems 114 that support connectivity across the payment network. An indication of the type of block applied to an existing card account identifier (e.g., a partial or complete block) may also be communicated. In certain example embodiments, a generated token corresponding to a card account identifier associated with conditions for temporary use may also be transmitted to the card issuer system 112.

As another non-limiting example, information indicative of a card account identifier for temporary use may be transmitted to a card issuer system 112 via an appropriate payment network. Such information may include, for example, a temporary card account identifier that has been generated and may further include information identifying conditions for temporary use of the temporary card account identifier that have been associated therewith. In other example embodiments, such information may include information identifying an existing card account identifier or a newly generated permanent card identifier as well as information indicative of associated conditions for temporary use.

Upon receipt of the above-described information, a card issuer system 112 may modify stored core account information to, for example, disassociate an existing card account identifier and associate a new permanent card account identifier with a corresponding financial account; associate a temporary card account identifier with a corresponding financial account; associate conditions for temporary use with an appropriate card account identifier (e.g., the existing card account identifier, the new permanent card account identifier, or the temporary card account identifier); or perform any other suitable processing in order to ensure that financial transactions may be executed in accordance with modified characteristics of card account identifier(s) that enable access to funds in a corresponding financial account. In those example embodiments in which the card issuer system 112 also receives the token, the token may be stored in association with the card account identifier associated with conditions for temporary use.

Referring now to other illustrative parts of the architecture 100, a funds dispensing system 116 may be associated with a corresponding funds dispensing location such as, for example, an ATM, POS, or financial institution branch location. The funds dispensing system 116 may include one or more funds dispensing computers 134 that may support processing in connection with requests for receipt of funds and the dispensing of funds in response thereto and/or requests for financial transactions involving the purchase of goods or services. The one or more funds dispensing computers 134 may include computing device(s) that are local to a corresponding funds dispensing location and/or computing device(s) that are remotely located. At least one of the funds dispensing computer(s) 134 may be configured to access and store data in at least one of one or more datastores 136 in order to perform processing supported by the funds dispensing computer(s) 134.

In the case of an ATM funds dispensing location for example, the ATM funds dispensing system 116 associated therewith may include an ATM machine that includes a reader or scanner configured to receive input (e.g., a card account identifier) encoded in the magnetic stripe of a payment or funds access card, a barcode, a QR code, or the like. The ATM machine may be further or alternatively configured to receive input from a user via one or more user interfaces such as, for example, a physical keypad, a virtual keypad, or the like. Such input may include a manual entry of a card account identifier, a token, an authentication PIN, or the like. The ATM machine may be configured to perform various financial account-related tasks based on received input such as accepting deposits, dispensing cash, displaying account details, and so forth.

In the case of a POS funds dispensing location, the funds dispensing system 116 associated therewith may include a POS device similarly configured to receive input via a reader or scanner and/or input from a user via one or more user interfaces and perform processing based on the received input such as, for example, initiating financial transactions including offline or online debit card transactions, credit card transactions, or the like. The amount of the transaction may include a purchase price for goods and/or services offered by a merchant, and optionally, may further include an amount of funds requested by a cardholder 102 for dispensing in the form of cash, for example.

In one or more example embodiments, an ATM machine or POS device may be configured to receive input indicative of a cardholder's desire to access funds using a card account identifier associated with conditions for temporary use. The input may be received as a result of a user selection of a selectable option presented via one or more user interfaces of the ATM machine or POS device. In certain other example embodiments, a cardholder 102 may inform a financial institution teller or other individual (e.g., an employee at a retail store at which a POS device is located) of a desire to obtain funds using a card account identifier associated with conditions for temporary use, and the financial institution teller or other individual may then interact with the funds dispensing system 116 to input the card account identifier and initiate associated processing. In still other example embodiments, the card account identifier itself—such as may be the case with a temporary card account identifier—may include a specific combination of alphanumeric characters that may indicate that the account identifier is associated with conditions for temporary use. Further, in certain example embodiments, the ATM or POS device may be configured to receive a token corresponding to a card account identifier associated with conditions of temporary use and construct the card account identifier from the token using a stored mapping of token segments to corresponding portions of card issuer identifiers. As previously noted, the ATM or POS device may receive a first user selection indicating that user input provided to the ATM or POS device is a token or a second different user selection indicating that user input is a temporary use card account identifier. In other example embodiments, the ATM or POS device may receive a single user selection indicating that user input is representative of a token or card account identifier and may be configured to distinguish between the two based on characteristics of the user input. For example, in certain example embodiments, the funds dispensing system 116, or more specifically, a device forming a part thereof (e.g., an ATM, a POS device, etc.) may determine that user input represents a token as opposed to a card account identifier by, for example, comparing a number of digits in the received token to an expected number of digits. If, for example, the received token includes less digits than a standard 16 digit card account identifier, token transformation logic to construct the card account identifier from the token may be initiated. As another example, user input may be determined to be a token based on the presence of one or more characters not available for use as part of a card account identifier (e.g., characters of a non-numeric character set).

The ATM machine or POS device may be configured to transmit information to one or more other funds dispensing computers 134 located at the funds dispensing location and/or one or more funds dispensing computers 134 located remotely from the funds dispensing location indicating that a financial transaction is being requested in connection with a card account identifier associated with conditions for temporary use. In other example embodiments, a financial institution teller or other individual may provide input indicative of the same to a local funds dispensing computer 134 (e.g., a client application executing on a local computer 134) and/or to a remote funds dispensing computer 134 via, for example, a Web-based application, a thin-client application, a mobile application, or the like.

Such local funds dispensing computer(s) 134 and/or remote dispensing computer(s) 134 may be configured to perform processing to determine whether the conditions for temporary use associated with a card account identifier are satisfied. In order to perform such processing, the funds dispensing computer(s) 134 may access information stored in one or more of the datastore(s) 136 such as, for example, information indicative of past transactional activity involving the card account identifier, information indicative of past transactional activity generally associated with the financial account, information indicative of the conditions for temporary use, and so forth.

In one or more other example embodiments, local funds dispensing computer(s) 134 and/or remote funds dispensing computer(s) 134 may communicate one or more requests to one or more other systems of the architecture 100 (e.g., the customer service system 110, the card issuer system 112, the service provider system 118, etc.) to perform processing to determine whether conditions for temporary use of a card account identifier are satisfied.

In any of the above scenarios, a response indicative of the determination as to whether conditions for temporary use of an associated card account identifier are satisfied may be communicated to an ATM machine, POS device, or a local computing device operable by a financial institution teller. If the conditions are deemed satisfied, the response may authorize the dispensing of funds to the cardholder 102. If at least one condition is deemed not satisfied, the response may indicate a denial of access to funds. If access to funds is denied, the response may specify a reason for the denial (e.g., card account identifier has expired, requested withdrawal amount exceeds a total withdrawal limit or a per-transaction limit, funds dispensing location is not within a geographic limit, etc.) which may be presented to the cardholder 102 in the form of a transaction decline message. It should be appreciated that, even in those instances in which the dispensing of funds is authorized, the cardholder 102 may cancel the transaction thereby resulting in no funds being disbursed.

In those example embodiments in which cash is actually dispensed to a cardholder 102 based on a request for funds made using a card account identifier for temporary use or a purchase transaction is executed, a request to debit a financial account associated with the card account identifier may be submitted to a payment network provider system 114 for transmission to a card issuer system 112. The card issuer system 112 may then instruct a core account processing system (which may form at least a portion thereof) to debit the financial account. In other example embodiments, a charge may be applied to a credit card account associated with the card account identifier.

In various example embodiments, a transaction fee may be assessed in connection with the dispensing of funds or a purchase involving a card account identifier associated with conditions for temporary use. An amount of the transaction fee may be based on any number of suitable factors including, but not limited to, a risk profile of the cardholder, an amount of the funds withdrawal, the nature of one or more of the conditions for temporary use, and so forth. For example, a higher transaction fee may be assessed for larger withdrawal amounts. As another non-limiting example, a higher transaction fee may be assessed in return for a longer time period during which the card account identifier remains active and available for use. In certain example embodiments, a tiered schedule for transaction fees may be provided. As part of establishing a set of preferences for establishing a card account identifier for temporary use, a cardholder 102 may be provided with the option of selecting among different conditions for temporary use (e.g., different expiration time limits, different total funds withdrawal limits, different per-transaction funds withdrawal limits, different geographic limits, etc.) based the transaction fees associated with each.

Further, in those example embodiments in which cash is actually dispensed to a cardholder 102 or a purchase is made using a card account identifier for temporary use, information indicative of various transaction details of the financial transaction may be communicated to a system (e.g., the customer service system 110, the card issuer system 112, the service provider system 118, etc.). The system that receives the transaction details may update stored transaction data associated with the card account identifier and the associated conditions for temporary use accordingly, or may communicate the information to another system that maintains the stored transaction data for appropriate updating. In this manner, the most up-to-date transaction data is available for determinations as to whether conditions for temporary use are satisfied for future transaction requests made using the card account identifier.

Referring now to other illustrative parts of the architecture 100, the service provider system 118 may include one or more service provider computers 138 and one or more datastores 140. At least one of the service provider computer(s) 138 may be configured to access and store data in at least one of the datastore(s) 140. The service provider system 118 may be configured to support any portion of the functionality described herein including, for example, card services functionality such as processing to apply a block to an existing card account identifier, processing to generate a new permanent card account identifier, processing to initiate the mailing of a payment or funds access card encoding the new permanent card account identifier, processing to establish a card account identifier for temporary use, and/or processing to generate a token corresponding to a card account identifier for temporary use.

In certain example embodiments, the service provider system 118 may be configured to perform automated processing to determine that a card account identifier has potentially been compromised based on an analysis of transaction activity with respect to fraud detection/mitigation rules. The fraud detection/mitigation rules may specify various transaction-related thresholds such as, for example, a maximum allowable number of transactions within a predetermined time period, a maximum allowable amount for all transactions within a predetermined time period, a maximum allowable amount for any single transaction, a maximum geographic range in which transactions are permitted, and so forth. Transaction activity associated with a card account identifier may be compared to these thresholds, and if some number of thresholds is exceeded, fraud mitigation processing may be automatically triggered. Such fraud mitigation processing may include applying a temporary or permanent block to the existing card account identifier and generating a new permanent card account identifier, and may further include, automatically triggering establishment of a card account identifier for temporary use and/or a corresponding token or informing the cardholder of the option to establish such a card account identifier.

It should be appreciated that the example systems, devices, components, and entities depicted in FIG. 1 as forming part of the architecture 100 are merely illustrative and not exhaustive. As such, additional and/or alternative systems, devices, components, and/or entities may be provided in various example embodiments of the disclosure, and additional and/or alternative hardware, software, firmware, and/or networking components may be provided.

For example, in certain example embodiments, such as those in which a cardholder 102 may interact with automated card services functionality, there may be no need for CSRs 106. As another non-limiting example, depending on any number of factors, only certain types of funds dispensing locations (e.g., an ATM location) may be available for use by a cardholder to obtain access to funds using a card account identifier for temporary use. As yet another non-limiting example, processing described herein as potentially being performed by the customer service system(s) 110 and/or the service provider system(s) 118 may instead be performed by other system(s) of the architecture 100 (e.g., the card issuer system 112).

Those of ordinary skill in the art will appreciate that the illustrative networked architecture 100 depicted in FIG. 1 is provided by way of example only. Numerous other operating environments, system architectures, and device configurations are within the scope of this disclosure. Various embodiments of the disclosure may include fewer or greater numbers of components and/or devices than those depicted in FIG. 1 and may incorporate some or all of the functionality described with respect to the illustrative architecture 100 depicted in FIG. 1, or additional functionality.

Figure 2:
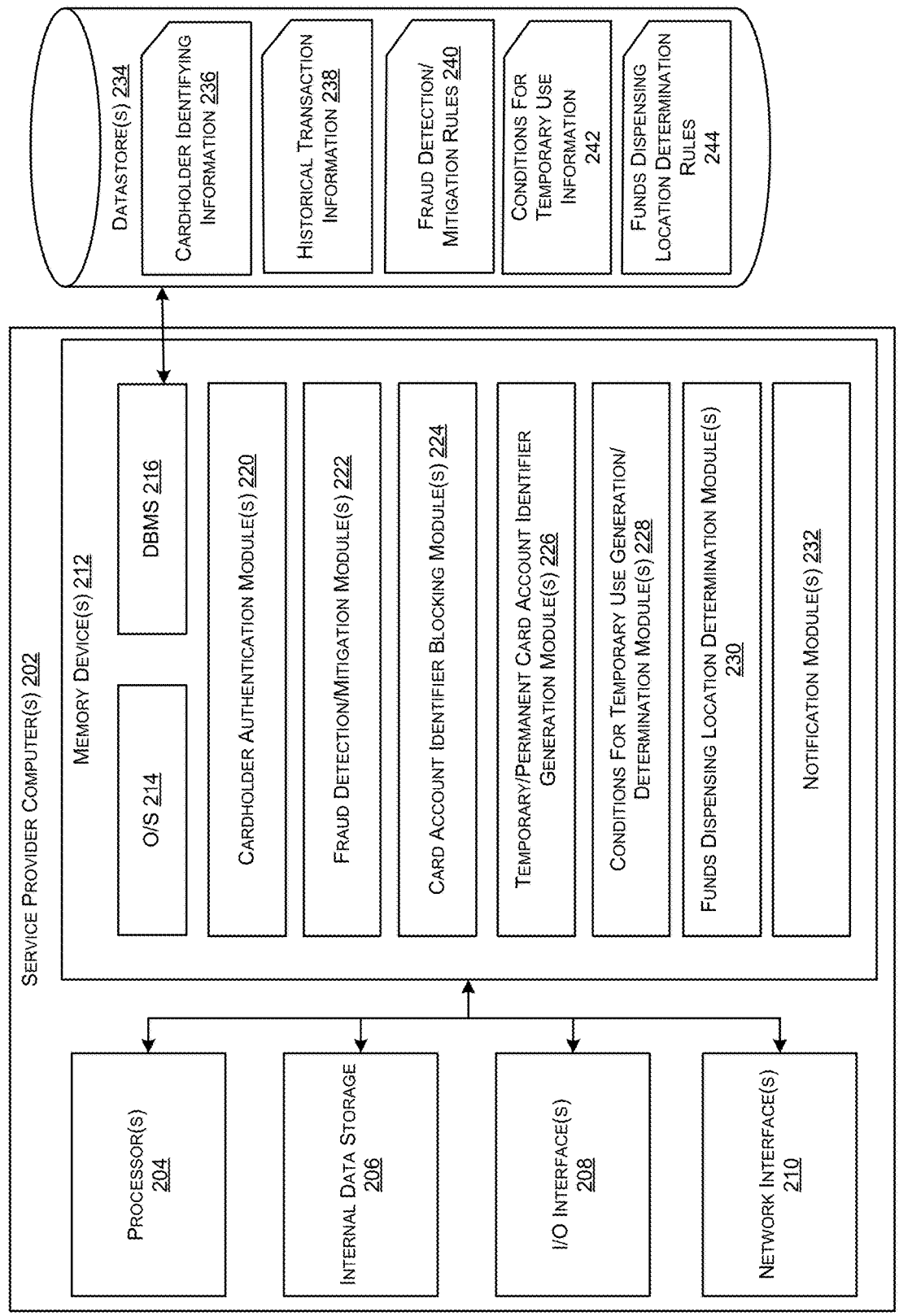
FIG. 2 is a schematic block diagram of an illustrative service provider computer configured to support at least a portion of functionality for establishing conditions for temporary use of card account identifiers in accordance with one or more example embodiments of the disclosure.

FIG. 2 is a schematic block diagram of an illustrative service provider computer 202 configured to support at least a portion of functionality for establishing conditions for temporary use of card account identifiers in accordance with one or more example embodiments of the disclosure. The service provider computer 202 may correspond to one or more of the service provider computer(s) 138 in one or more example embodiments. Although the service provider computer 202 will be described in the following discussion as being configured to perform various processing, it should be appreciated that any one or more aspects of the processing may be distributed across multiple service provider computers 202 (e.g., multiple service provider computers 138). Further, in various example embodiments of the disclosure, one or more other systems of the architecture 100 (e.g., the customer service system 110, the card issuer system 112, etc.) may be configured to perform any one or more aspects of the processing described as being performed by the service provider computer 202. As such, any one or more program modules depicted in FIG. 2 as being executable by the service provider computer 202 may, in various example embodiments, be distributed across multiple service provider computers 202 and/or other systems, devices or components of the architecture 100.

In an illustrative configuration, the service provider computer 202 may include one or more processors (processor(s)) 204, one or more memory devices 212 (generically referred to herein as memory 212), additional data storage 206, one or more input/output ("I/O") interface(s) 208, and/or one or more network interface(s) 210. These various components will be described in more detail hereinafter.

The memory 212 of the service provider computer 202 may include volatile memory (memory that maintains its state when supplied with power) such as random access memory (RAM) and/or non-volatile memory (memory that maintains its state even when not supplied with power) such as read-only memory (ROM), flash memory, and so forth. In various implementations, the memory 212 may include multiple different types of memory, such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 212 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The memory 212 may store computer-executable instructions that are loadable and executable by the processor(s) 204, as well as data manipulated and/or generated by the processor(s) 204 during the execution of the computer-executable instructions. For example, the memory 212 may store one or more operating systems (O/S) 214; one or more database management systems (DBMS) 216; and one or more program modules, applications, or the like such as, for example, one or more cardholder authentication modules 220, one or more fraud detection/mitigation modules 222, one or more card account identifier blocking modules 224, one or more temporary/permanent card account identifier generation modules 226, one or more conditions for temporary use generation/determination modules 228, one or more funds dispensing location determination modules 230, and one or more notification modules 232.

It should be appreciated that the program modules depicted in FIG. 2 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the service provider computer(s) 202 and/or hosted on remote computing devices accessible via one or more of the network(s) 120 may be provided to support additional functionality (e.g., customer service system 110 functionality) and/or functionality provided by the program modules depicted in FIG. 2. Further, functionality may be modularized differently such that processing described as being supported by the collection of program modules depicted may be performed by a fewer of greater number of modules. In addition, program modules that support the functionality described herein may form part of one or more applications executable across any number of systems or devices of architecture 100 in accordance with any suitable computing model such as, for example, a client-server model, a peer-to-peer model, and so forth. Functionality supported by the various program modules of the service provider computer 202 will be described in more detail through reference to FIGS. 3-9.

The various illustrative program modules depicted as being loaded into the memory 212 may include computer-executable instructions that in response to execution by the processor(s) 214 cause various processing to be performed. In order to perform such processing, the program modules may utilize various data/information stored in the memory 212, in the data storage 206, and/or in one or more external datastores such as the datastore(s) 234. Such data/information may include, for example, cardholder identifying information 236, cardholder and/or financial account historical transaction information 238, fraud detection/mitigation rules 240, information 242 relating to conditions for temporary use of card account identifiers, rules 244 for determining funds dispensing locations, and/or any other suitable data. The datastore(s) 234 may include any one or more of the datastores depicted in FIG. 1 such as, for example, one or more of the datastore(s) 140, one or more of the datastore(s) 124, and/or one or more of the datastore(s) 128. It should be appreciated that the data/information depicted as being contained in the datastore(s) 234 is merely illustrative and that additional or alternative data/information may be provided in various example embodiments. Further, while not depicted in FIG. 2, any of the data stored in the datastore(s) 234 or the data storage 206 may be loaded into the memory 212 as well.

Referring now to other illustrative components of the service provider computer 202, the (O/S) 214 loaded into the memory 212 may provide an interface between other application software executing on the service provider computer 202 and hardware resources of the service provider computer 202. More specifically, the O/S 214 may include a set of computer-executable instructions for managing hardware resources of the service provider computer 202 and for providing common services to other application programs (e.g., managing memory allocation among various application programs). The O/S 214 may include any operating system now known or which may be developed in the future including, but not limited to, any server operating system, any mainframe operating system, or any other proprietary or non-proprietary operating system.

As previously noted, the service provider computer 202 may further include data storage 206 such as removable storage and/or non-removable storage including, but not limited to, magnetic storage, optical disk storage, and/or tape storage. Data storage 206 may provide non-transient storage of computer-executable instructions and other data. The data storage 206 may include storage that is internal and/or external to the service provider computer 202. The memory 212 and/or the data storage 206, removable and/or non-removable, are examples of computer-readable storage media (CRSM) as that term is used herein.

The DBMS 216 depicted as being loaded into the memory 212 may support functionality for accessing, retrieving, storing, and/or manipulating data stored in the datastore(s) 234, data stored in the memory 212, and/or data stored in the data storage 206. The DBMS 216 may use any of a variety of database models (e.g., relational model, object model, etc.) and may support any of a variety of query languages. It should be appreciated that any data and/or computer-executable instructions stored in the memory 212, including any of the program modules, the O/S 214, and the DBMS 216, may be additionally, or alternatively, stored in the data storage 206 and/or external datastore(s) (e.g., one or more of the datastore(s) 234) and loaded into the memory 212 therefrom.

The processor(s) 204 may be configured to access the memory 212 and execute computer-executable instructions stored therein. For example, the processor(s) 204 may be configured to execute computer-executable instructions of the various program modules of the service provider computer 202 to cause or facilitate various operations to be performed in accordance with one or more embodiments of the disclosure. The processor(s) 204 may include any suitable processing unit capable of accepting digital data as input, processing the input data in accordance with stored computer-executable instructions, and generating output data. The processor(s) 204 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), and so forth.

The service provider computer 202 may further include one or more I/O interfaces 208 that may facilitate the receipt of input information by the service provider computer 202 from one or more I/O devices as well as the output of information from the service provider computer 202 to the one or more I/O devices. The I/O devices may include, for example, one or more user interface devices that facilitate interaction between a user and the service provider computer 202 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The service provider computer 202 may be configured to communicate with any of a variety of other systems, platforms, networks, devices, and so forth (e.g., the customer service system 110, the card issuer system 112, etc.) via one or more of the network(s) 120. The service provider computer 202 may include one or more network interfaces 210 that may facilitate communication between the service provider computer 202 and any of the systems, networks, platforms, devices or components of the architecture 100.

Those of ordinary skill in the art will appreciate that the illustrative service provider computer 202 depicted in FIG. 2, and more generally, the service provider system 118 or any of the other illustrative components of the architecture 100 depicted in FIG. 1, may include alternate and/or additional hardware, software or firmware components beyond those described or depicted without departing from the scope of the disclosure. More particularly, it should be appreciated that software, firmware or hardware components depicted as forming part of service provider computer 202 are merely illustrative and that some components may not be present or additional components may be provided in various embodiments. While various illustrative program modules have been depicted as software modules loaded into a memory, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules.

Illustrative Data Flows and Processes

Figure 3:
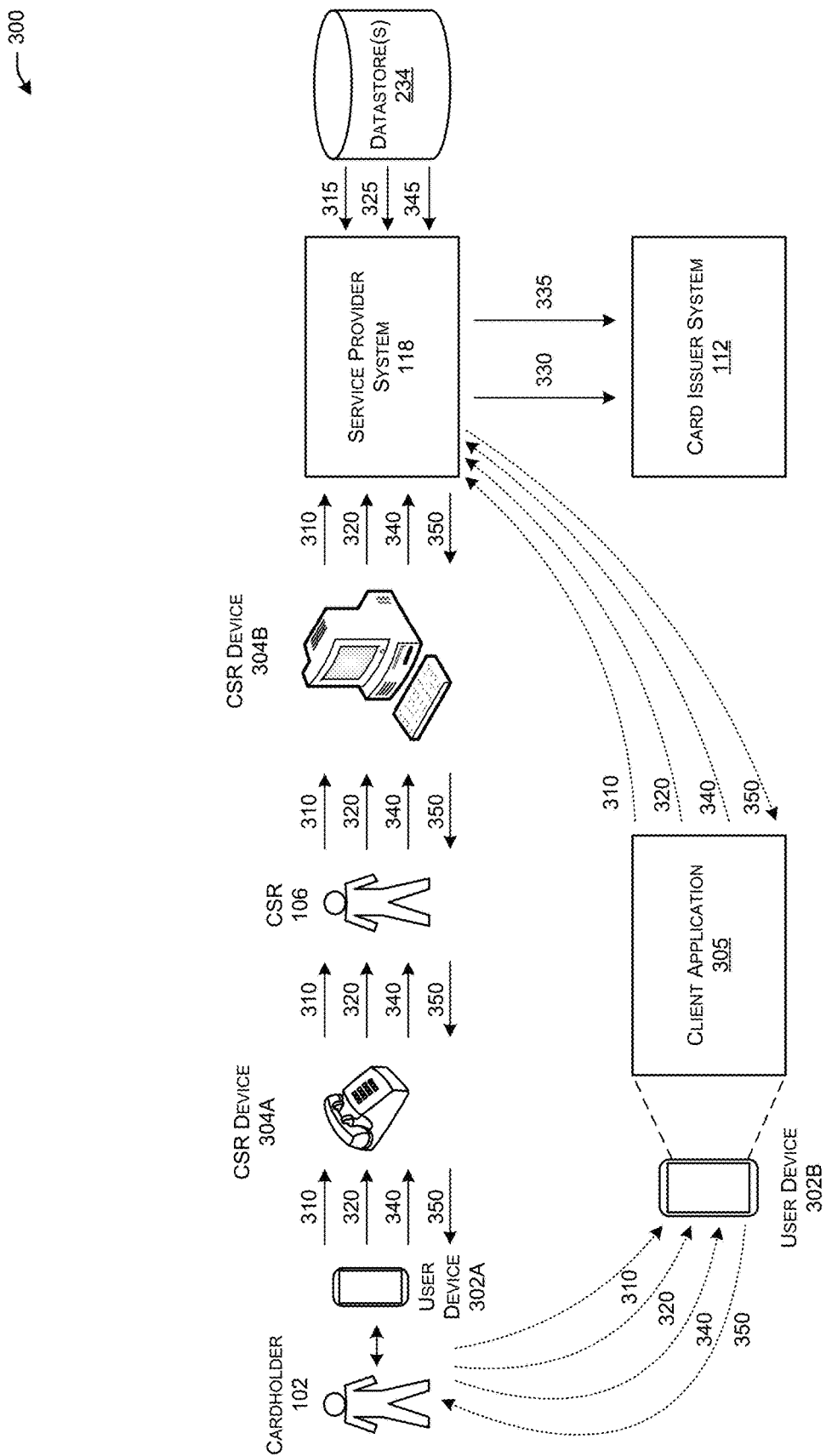
FIG. 3 is a schematic data flow diagram depicting illustrative data flows between various entities in connection with processing a request for a card account identifier for temporary use in accordance with one or more example embodiments of the disclosure.

FIG. 3 is a schematic data flow diagram depicting illustrative data flows between various entities in connection with processing a request for a card account identifier for temporary use in accordance with one or more example embodiments of the disclosure. The illustrative data flows depicted in FIG. 3 will be described with reference to the illustrative processes of FIGS. 4-7. It should be noted that the description of certain data flows depicted in FIG. 3 may differ depending on the particular process/implementation being described. In addition, it should be appreciated that the data flows depicted in FIG. 3 are illustrative and may not be representative of an actual number of data communications that may occur in various example embodiments of the disclosure. Further, the communicating entities and/or the order in which communications occur between the various entities may vary across example embodiments.

In addition, one or more operations of any of the illustrative methods of FIGS. 4-9 may be described as being performed by the service provider system 118, or more specifically, by one or more program modules executing on one or more service provider computers 138/202 of the service provider system 118. Any such operation may be performed by the service provider system 118 based on a request received from another system (e.g., the customer service system 110). It should be appreciated, however, that any of the operations of the methods of FIGS. 4-9 may be performed by any one or more systems of the architecture 100 other than the service provider system 118 such as, for example, the customer service system 110, the card issuer system 112, the payment network provider system 114, or the funds dispensing system 116.

In addition, it should be noted that processing performed in response to execution of computer-executable instructions provided as part of an application, program module, or the like may be described herein as being performed by the application or program module itself, by a device on which the application, program module, or the like is executing, or by a system that includes such a device. Further, any operation described as an initiation of processing may (but need not) encompass the processing as well.

Figure 4:
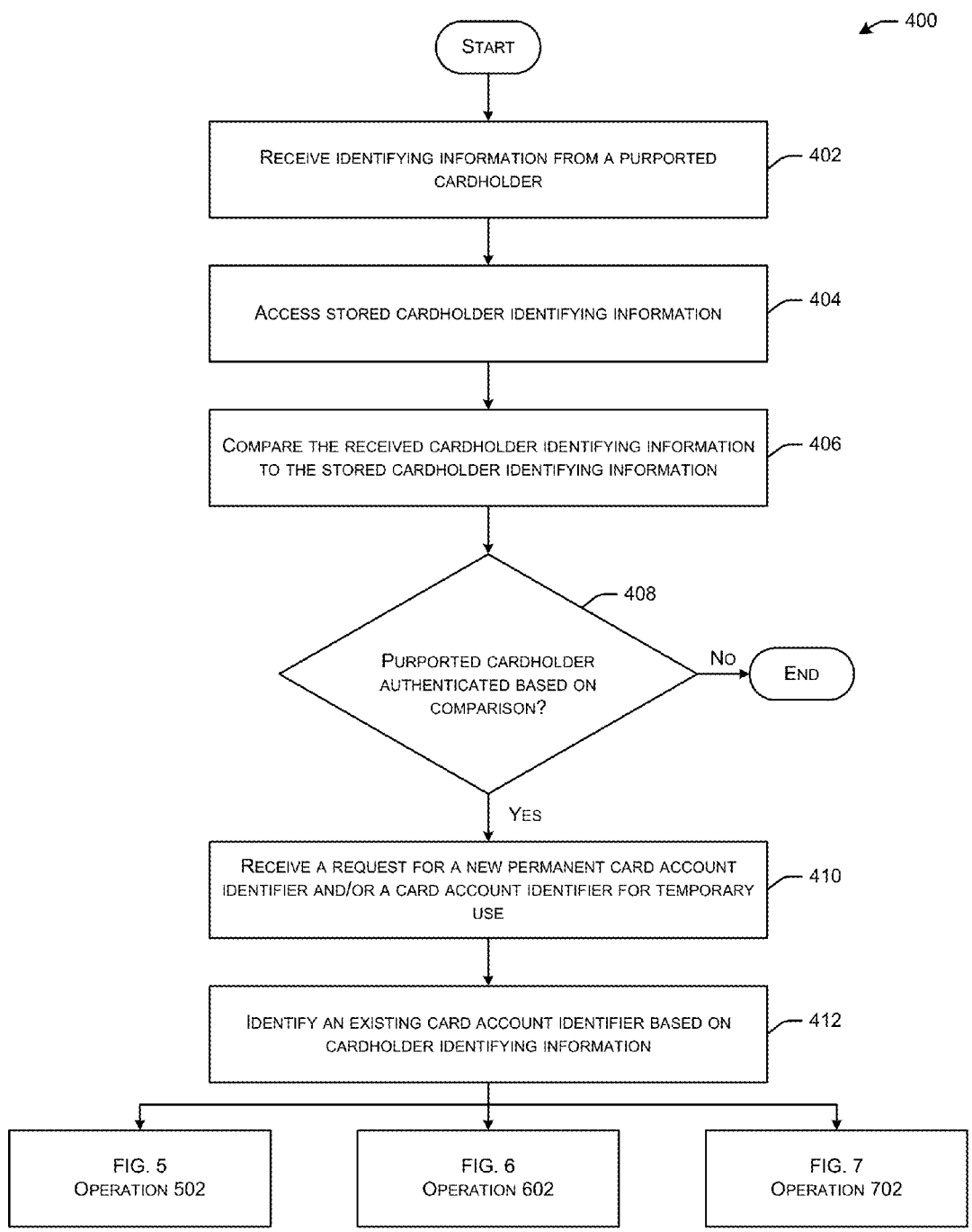
FIG. 4 is a process flow diagram of an illustrative method for authenticating a purported cardholder and initiating processing of a request for a card account identifier for temporary use responsive to authentication of the purported cardholder in accordance with one or more example embodiments of the disclosure.

FIG. 4 is a process flow diagram of an illustrative method 400 for authenticating a purported cardholder and initiating processing of a request for a card account identifier for temporary use responsive to authentication of the purported cardholder in accordance with one or more example embodiments of the disclosure.

Referring now to FIG. 4 in conjunction with FIG. 3, at block 402, the service provider system 118 may receive identifying information 310 on behalf of a purported cardholder. The identifying information 310 may be received by the service provider system 118 via communications involving any number of user devices 104 and/or any number of CSR devices 108.

More specifically, a cardholder 102 may utilize a user device 302A (which may include any of the user devices 104 depicted in FIG. 1 such as, for example a device with voice communications capabilities, instant messaging capabilities, etc.) to communicate with a CSR 106 via a corresponding CSR device 304A (which may include any of the CSR devices 108 depicted in FIG. 1 such as, for example, a device with voice communications capabilities, instant messaging capabilities, etc.). In particular, in an example embodiment, a cardholder 102 may utilize the user device 302A (e.g., a telephonic device) to communicate the identifying information to a CSR 106 via the CSR device 304A (e.g., a telephonic device), and the CSR 106 may, in turn, utilize another CSR device 304B (e.g., a computing device) to communicate the identifying information to the service provider system 118. The CSR device 304B may be configured to communicate with the service provider system 118 via one or more of the network(s) 120, potentially via an intermediary such as the customer service system 110. In those example embodiments in which customer service system 110 functionality is incorporated into the service provider system 118, the CSR device 304B may form part of the service provider system 118.

In other example embodiments, the cardholder 102 may access a client application 305 via a user device 302B (which may include any suitable user device 104 depicted in FIG. 1) and may provide the identifying information 310 as input to the client application, which may, in turn, transmit the identifying information 310 to the service provider system 118.

The cardholder may have initiated communication with the CSR 106 or accessed the client application 305 responsive to determining that an existing card account identifier has been potentially compromised or is unavailable for use. For example, the cardholder 102 may be aware that a payment or funds access card encoding the card account identifier has been lost or stolen or that the card account identifier has been otherwise misappropriated and may initiate the communication as a result.

In other example embodiments, automated fraud detection/mitigation processing may have detected potentially fraudulent activity in connection with use of the card account identifier, and the CSR 106 or an automated system may have initiated communication with the cardholder 102 to inform the cardholder 102 of the potentially fraudulent activity. The fraud detection/mitigation processing may be performed responsive to execution of computer-executable instructions provided as part of, for example, the fraud detection/mitigation module(s) 222 and may utilize fraud detection/mitigation rules 240 stored, for example, in one or more of the datastore(s) 234. The fraud detection/mitigation rules 240 may include, for example, transaction-related thresholds that trigger the processing and/or that indicate that potentially fraudulent activity is occurring.

In certain example embodiments, the CSR 106 or an automated system may inform the cardholder 102 of the potentially fraudulent activity via a non-synchronous communication (e.g., a voicemail, an e-mail, an SMS message, etc.), and the cardholder 102 may establish communication with the CSR 106 or the automated system (which may be, for example, an Interactive Voice Response (IVR) system) or may access the client application 305 in response to receiving the non-synchronous communication.

The identifying information 310 received by the CSR 106 or the client application 305 may include a name of the cardholder 102, a user ID, or the like in order to facilitate initial identification of the cardholder 102. In those example embodiments in which a payment or funds access card has been lost or stolen or is otherwise unavailable for use, the cardholder 102 may not be able to provide the existing card account identifier.

The identifying information may further include one or more authentication credentials that are unambiguously associated with the cardholder 102 and that may serve to authenticate the purported cardholder as the cardholder 102 or other authorized user, and to protect against fraudulent misuse of the cardholder's account. Such authentication credentials may include, without limitation, one or more of a password, certificate, or other security token; information that is unlikely to be widely known and that may be stored as part of the cardholder's account profile information such as, for example, a social security number or other government issued identifier (or a portion thereof), a mother's maiden name, a security word or phrase such as an answer to a security question (e.g., what is your best friend's last name?), or the like; information that may be used in conjunction with other authentication credentials to authenticate the purported cardholder such as, for example, a phone number, zip code, or the like; and so forth. The identifying information 310 may further include information that may be stored on or otherwise associated with the user device 302B utilized by the purported cardholder such as, for example, a telephone number, an Internet Protocol (IP) address, a Media Access Control (MAC) address, a cookie, or the like.

Still referring to FIGS. 3 and 4 in conjunction with each other, at block 404, the service provider system 118 may access stored cardholder identifying information 315 such as, for example, some portion of the cardholder identifying information 236 stored in the datastore(s) 234. For example, computer-executable instructions provided as part of the cardholder authentication module(s) 220 may be executed by the processor(s) 204 to cause appropriate stored cardholder identifying information 315 to be accessed and retrieved based at least in part upon at least a portion of the received identifying information 310. The retrieved cardholder identifying information 315 may be stored in association with or as part of an account profile associated with the cardholder.

At block 406, computer-executable instructions provided as part of the cardholder authentication module(s) 220 may be executed to perform a comparison of at least a portion of the received identifying information 310 to at least a portion of the stored cardholder identifying information 315 retrieved from the datastore(s) 234. At block 408, a determination may be made as to whether the purported cardholder can be authenticated based on the comparison performed at block 406. For example, computer-executable instructions provided as part of the cardholder authentication module(s) 220 may be executed to determine whether the received identifying information 310 matches the retrieved stored cardholder identifying information 315. A probabilistic matching algorithm may be employed that determines that a match exists if a specified threshold is met (e.g., a threshold number of matching fields or matching characters), even if an exact match is not present. In other example embodiments, an exact match may be required in order to provide added account security.

If the identifying information 310 received from the purported cardholder does not match the stored cardholder identifying information 315 based on an appropriate matching algorithm, a determination may be made at block 408 that the purported cardholder cannot be authenticated, and the method 400 may end. Alternatively, if the identifying information 310 received from the purported cardholder suitably matches the stored cardholder identifying information 315, a determination may be made at block 408 that the purported cardholder can be authenticated and the method 400 may proceed to block 410.

At block 410, the service provider system 118 may receive a request for a new permanent card account identifier and/or a request for a card account identifier for temporary use. The request for the new permanent card account identifier may include a request to apply a block to an existing card account identifier that may be potentially compromised. In certain example embodiments, the request for a new permanent card account identifier and the request for a card account identifier for temporary use may be received in conjunction with one another, perhaps as a single, consolidated request. The data transmission 320 depicted in FIG. 3 may be associated with a request for a new permanent card account identifier and/or a request for a card account identifier for temporary use.

For example, the cardholder 102 may indicate a desire to receive a new permanent card account identifier as well as a desire to receive a card account identifier for temporary use during a same communication session with a CSR 106, an IVR system, or a client application (e.g. the client application 305) that interacts with a server-side application. The CSR 106 may, in turn, utilize a CSR device 108 (e.g., the CSR device 304B) to generate and submit a request for the new permanent card account identifier and/or a request for a card account identifier for temporary use to the service provider system 118. The CSR device 108 may be configured to communicate with the service provider system 118 directly via one or more of the network(s) 120 or via an intermediary such as the customer service system 110. As another non-limiting example, an IVR system (perhaps hosted by the customer service system 110 or the service provider system 118) or a client application executing on a user device 104 (e.g., the user device 302B) operable by the cardholder 102 (e.g., the client application 305) may be configured to communicate the request(s) to the service provider system 118 responsive to interaction with the cardholder 102. In certain example embodiments, the CSR 106 may utilize the CSR device 108 to communicate a request to the service provider system 118 to generate a token corresponding to the temporary use card account identifier. In other example embodiments, an IVR system or the client application 305 may communicate the request for the token. The request for the token may be communicated as part of a same request for the temporary use card account identifier or as part of a separate request.

In other example embodiments, a cardholder communication requesting a card account identifier for temporary use may be received subsequent to an initial cardholder communication requesting a new permanent card account identifier or subsequent to a communication received by the cardholder—from a CSR 106, an automated system, or the like—indicating that a block has been applied to an existing card account identifier and that a new permanent card account identifier has been generated. As previously noted, an indication of the cardholder's request may be received by the service provider system 118 via direct interaction with the cardholder or via an intermediary such as, for example, a CSR 106, the customer service system 110, or the like.

In still other example embodiments, processing for establishing the card account identifier for temporary use may be automatically triggered responsive to an automated determination that an existing card account identifier has been potentially compromised. The service provider system 118 and/or one or more other systems of the architecture 100 may be configured to make the automated determination. As described previously, such an automated determination may be based on an analysis of transaction history involving the existing card account identifier with respect to one or more fraud detection/mitigation rules, and may result in a block being automatically applied to the existing card account identifier. The block may be a permanent block that triggers, that occurs at least partially concurrently with, or that occurs subsequent to the initiation of processing to generate a new permanent card account identifier. Alternatively, the block may be temporary at first, and may be made permanent upon confirmation by the cardholder of the fraudulent nature of one or more flagged transactions, or removed upon confirmation by the cardholder that flagged transaction(s) are not fraudulent.

In yet other example embodiments, a request for a card account identifier for temporary use may be received from a cardholder without receiving an indication that an existing card account identifier has been potentially compromised or without an automated determination of the same being made. For example, the existing card account identifier may simply be unavailable for use but not at risk of being compromised. In such embodiments, the cardholder may initiate communication with a CSR 106, an automated customer service system (e.g., an IVR system or the like forming part of the customer service system 110), or directly with the service provider system 118 to request a card account identifier for temporary use.

Responsive to receipt of a request to initiate processing to apply a block to an existing card account identifier and generate a new card account identifier, responsive to receipt of an indication to initiate such processing, or occurrence of an event (e.g., a determination of potential fraudulent activity) that triggers such processing, the service provider system 118 may initiate such processing by identifying an existing card account identifier associated with the cardholder at block 412. For example, the service provider system 118 may be configured to utilize the received identifying information 310 to perform a look-up of corresponding stored cardholder identifying information 315 and identify the existing card account identifier based on stored data indicative of the association between the existing card account identifier and the stored cardholder identifying information 315.

Figure 5:
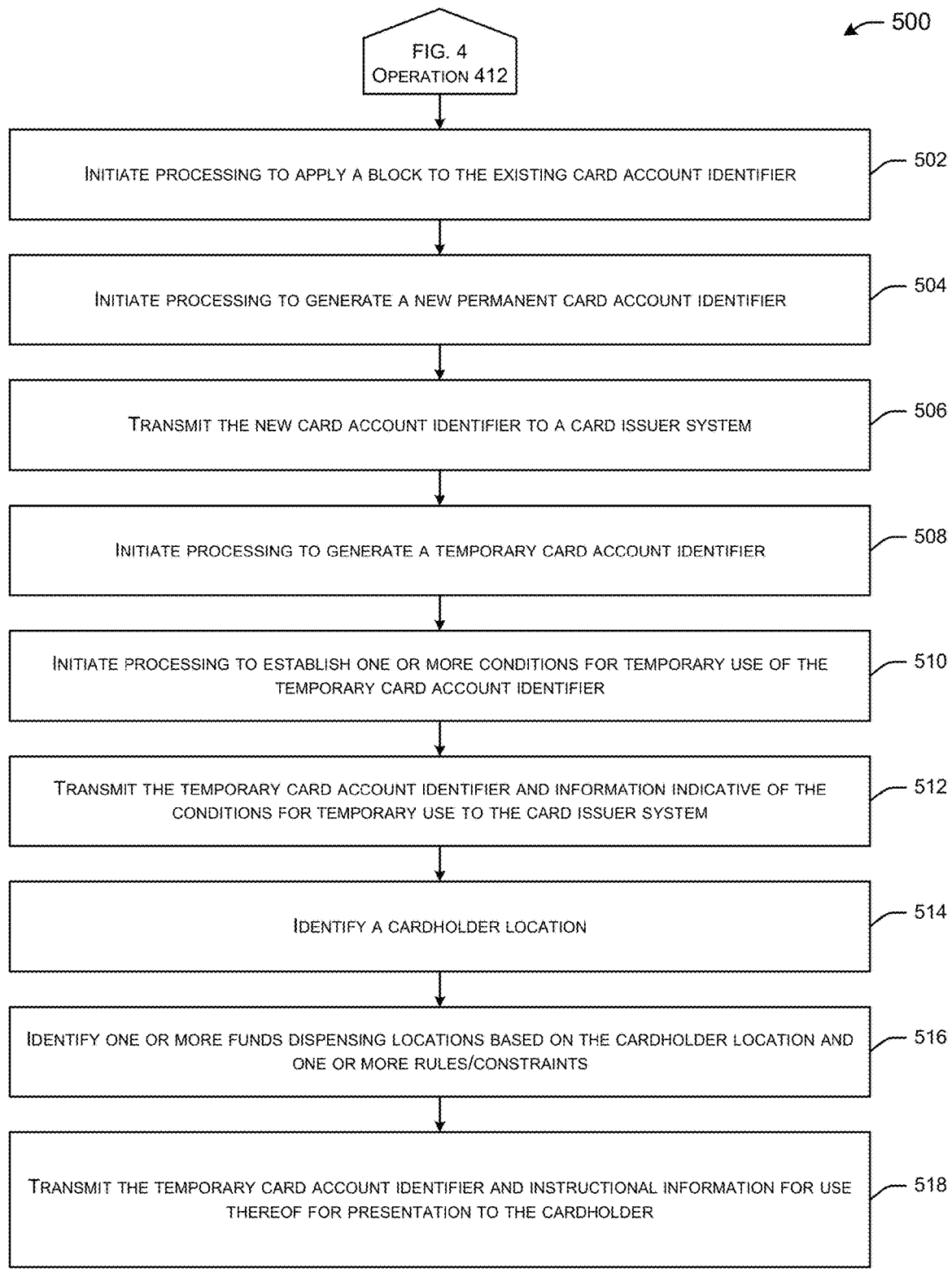
FIG. 5 is a process flow diagram of an illustrative method for applying a block to an existing card account identifier, generating a temporary card account identifier, and establishing conditions for temporary use of the temporary card account identifier in accordance with one or more example embodiments of the disclosure.
Figure 6:
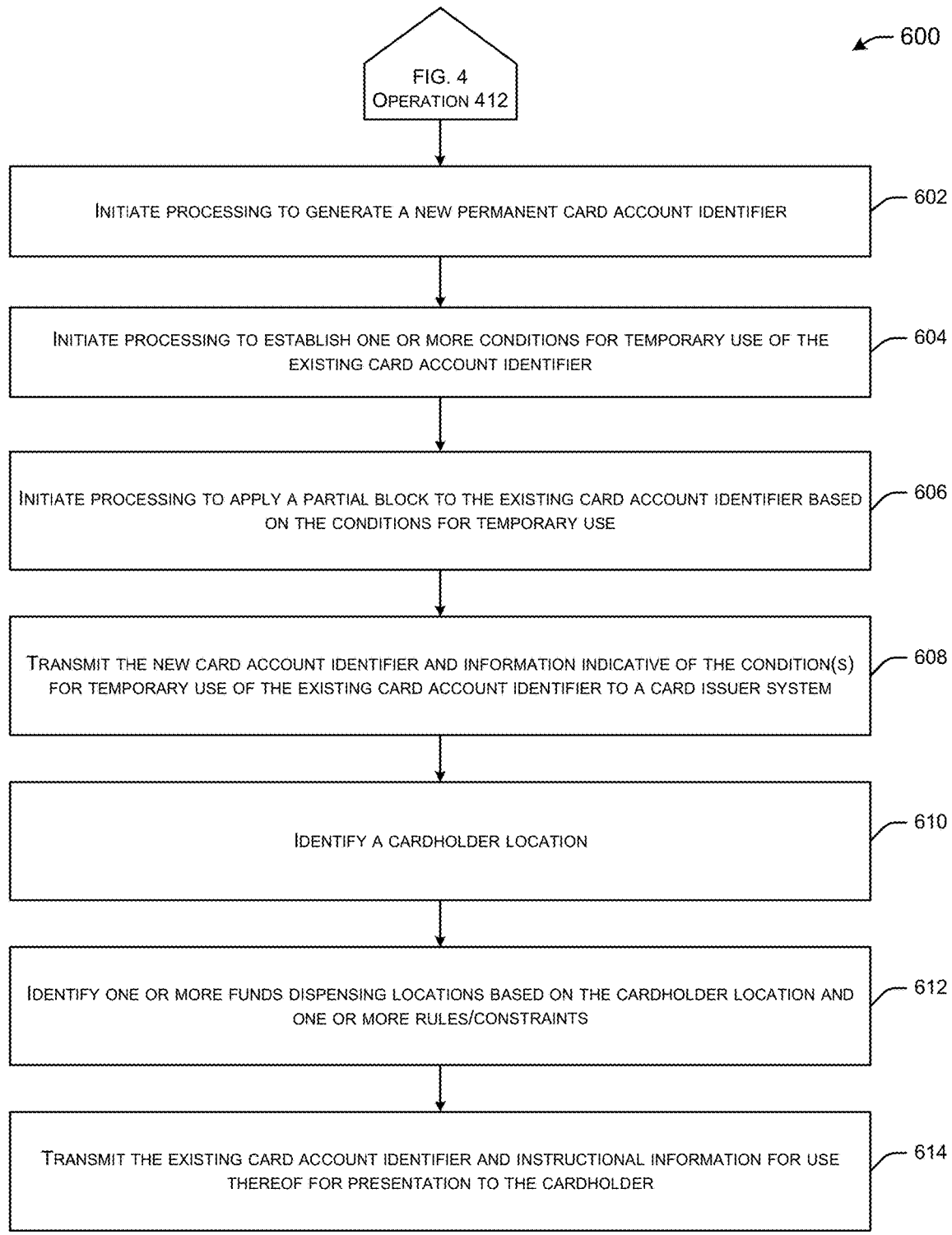
FIG. 6 is a process flow diagram of an illustrative method for applying a partial block to an existing card account identifier and establishing conditions for temporary use of the existing card account identifier in accordance with one or more example embodiments of the disclosure.
Figure 7:
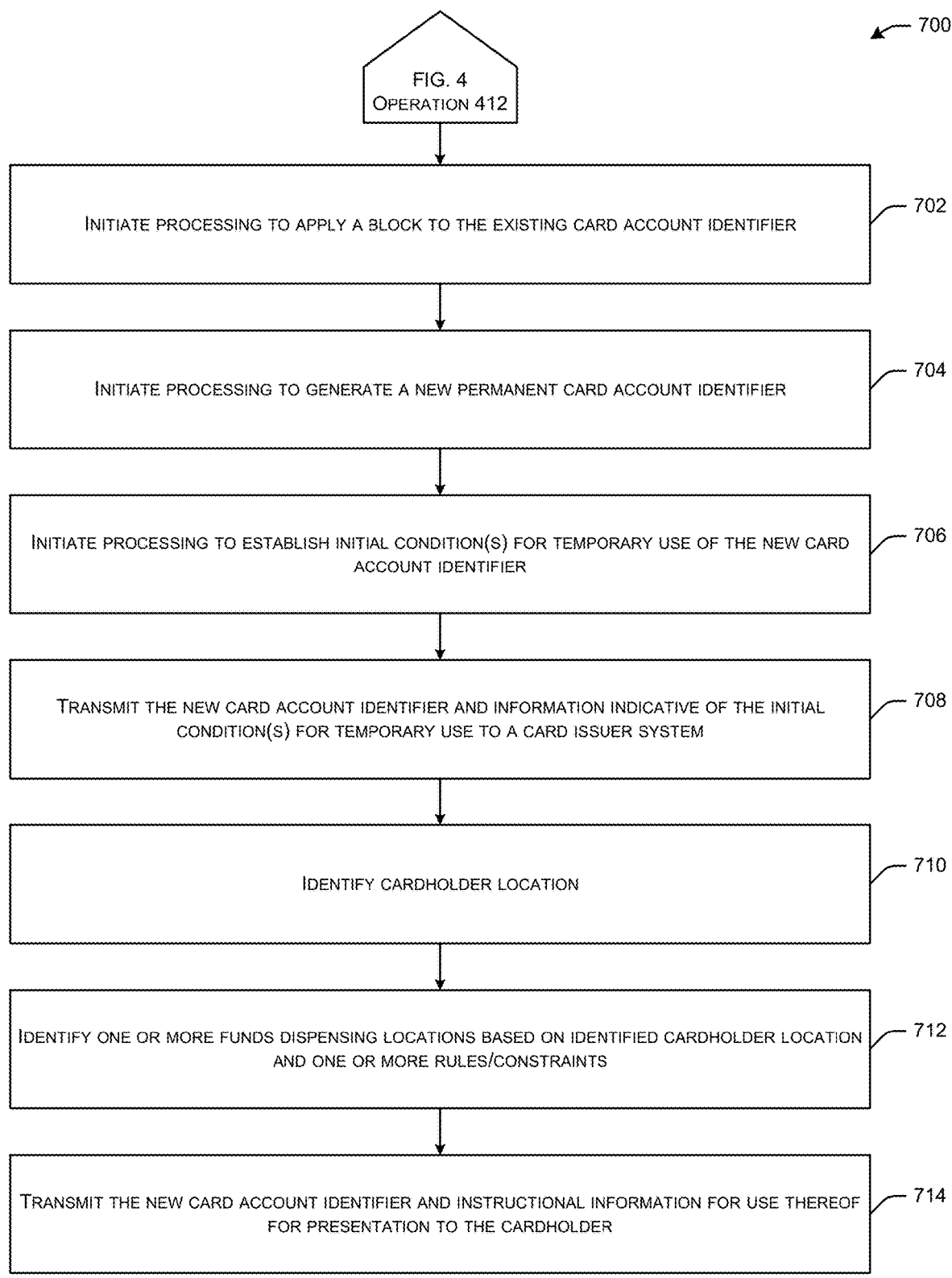
FIG. 7 is a process flow diagram of an illustrative method for applying a block to an existing card account identifier, generating a new card account identifier, and establishing initial conditions for temporary use of the new card account identifier in accordance with one or more example embodiments of the disclosure.

Following block 412, processing in accordance with the one of the illustrative methods of FIG. 5, FIG. 6, or FIG. 7 may be performed in various example embodiments of the disclosure. Each of the illustrative methods 500, 600, and 700 of FIGS. 5, 6, and 7 may, respectively, include processing for applying a block to an existing card account identifier and generating a new permanent card account identifier; although, as described previously, such processing may not be performed in various example embodiments such as those in which only a card account identifier for temporary use is being requested. The illustrative methods 500, 600, and 700 differ in the type of card account identifier that is established for temporary use.

As will be described in more detail hereinafter, method 500 of FIG. 5 includes processing for establishing a temporary card account identifier as the card account identifier for temporary use; method 600 of FIG. 6 includes processing for establishing the existing card account identifier as the card account identifier for temporary use; and method 700 of FIG. 7 includes processing for establishing the newly generated permanent card account identifier as the card account identifier for temporary use. In certain example embodiments, a service provider may implement the same processing (e.g., generation of a temporary card account identifier for temporary use) for all cardholders. In such embodiments, the particular processing that is implemented may depend on any number of factors including, for example, a desire to minimize cardholder confusion, service provider system capabilities, core account processing system capabilities, and so forth. In other example embodiments, a cardholder may be provided with a capability to indicate a preferred implementation. In various example embodiments, different transaction costs may be associated with different implementations.

FIG. 5 is a process flow diagram of the illustrative method 500 for applying a block to an existing card account identifier, generating a temporary card account identifier, and establishing conditions for temporary use of the temporary card account identifier in accordance with one or more example embodiments of the disclosure.

Upon identification of the existing card account identifier at block 412, computer-executable instructions provided as part of, for example, the card account identifier blocking module(s) 224 may be executed to initiate processing to apply a block to the existing card account identifier. The card account identifier blocking module(s) 224 may be configured to perform the block or may generate and submit a request—potentially via a payment network provider system 114—to another system (e.g., the card issuer system 112) to perform the block. For example, upon receipt of the request to apply the block, the card issuer system 112 may leverage a fraud rules system to activate rules that block all future uses of the existing card account identifier. In those embodiments in which the service provider system 118 applies the block, an indication of the block and information indicating a nature of the block (e.g., partial, complete, etc.) may be communicated to the card issuer system 112 (or more specifically to a core account processing system forming part of the card issuer system 112).

At block 504, computer-executable instructions provided as part of, for example, the temporary/permanent card account identifier generation module(s) 226 may be executed to initiate processing to generate a new permanent card account identifier. Processing to generate a new permanent card account identifier may further include initiating processing to generate and mail a payment or funds access card that encodes the new permanent card account identifier. The module(s) 226 may be configured to perform the processing initiated at block 504 or may be configured to generate and submit a request to another system (e.g., the card issuer system 112) to perform the processing.

Referring now to FIG. 5 in conjunction with FIG. 3, in those embodiments in which the service provider system 118 is configured to perform the processing initiated at block 504, computer-executable instructions provided as part of, for example, the notification module(s) 232 may be executed to communicate, at block 506, an indication 330 of the newly generated permanent card account identifier to the card issuer system 112 for association with the appropriate financial account of the cardholder.

The operations of block 412 of FIG. 4 and blocks 502-506 may be performed responsive to a cardholder request or an automated trigger to block an existing card identifier and generate a new permanent card account identifier. However, such processing may not be performed in certain example embodiments, such as in those embodiments in which the existing card account identifier is not determined to be potentially compromised. Further, even in those embodiments in which the request received at block 410 comprises a request to block an existing card identifier and generate a new permanent card account identifier, the service provider system 118 may be configured to perform a check prior to performing the operations of blocks 502-506 to ensure that such processing has not already been initiated such as, for example, responsive to an automated fraud determination.

The operations of blocks 508-518 may be performed responsive to a request or an automated trigger to establish a card account identifier for temporary use. Although depicted as occurring sequentially after the processing initiated at blocks 502 and 504, the processing for establishing a card account identifier for temporary use may occur prior to or at least partially concurrently with such other processing. Further, as previously noted, the operations of blocks 502-506 may not occur in certain example embodiments.

At block 508, computer-executable instructions provided as part of, for example, card account identifier generation module(s) 226 may be executed to initiate processing to generate a temporary card account identifier. In certain example embodiments, prior to initiating processing to generate the temporary card account identifier, a determination may be made as to whether one or more conditions restricting the generation of a temporary card account identifier are satisfied. As a non-limiting example, a threshold may be specified that represents a maximum number of temporary card account identifiers that may be generated over a specified period of time. According to this example, the processing for generating the temporary card account identifier may then only be initiated if a determination is made that the threshold would not exceeded if the temporary card account identifier is generated. In another illustrative, non-limiting example, a temporary card account identifier may only be generated if the request for such an identifier is received within a threshold period of time from when an existing card account identifier is reported as potentially compromised or from when a block is applied to the existing card account identifier based on automated fraud detection processing. It should be appreciated that the conditions described above are merely illustrative and not exhaustive and that any suitable conditions (or no conditions) restricting generation of the temporary card account identifier may be provided.

Although the temporary card account identifier that is generated may not be associated with a physical card, the temporary card account identifier may be an actual account identifier usable by the cardholder to initiate financial transactions against a corresponding financial account in accordance with associated conditions for temporary use. That is, the temporary card account identifier need not be mapped or resolved to an actual card account identifier prior to transmission through a payment network or use by a core account processing system of a financial institution, as is the case with pseudo account identifiers. As such, the temporary card account identifier may be transmitted via payment networks (e.g., any payment network supported by the payment network provider system 114) in a manner similar to an existing card account identifier or a new permanent card account identifier. In certain example embodiments, a physical card that encodes the temporary card account identifier may be generated.

Further, in certain example embodiments, either as part of the operation(s) at block 508, or as part of distinct operation(s), computer-executable instructions provided as part of the card account identifier generation module(s) 226 may be executed to generate a token corresponding to the temporary card account identifier. The token may use a broader character set and/or contain a lesser number of characters or digits (e.g., 11 digits) as compared to the temporary card account identifier, and may be generated by substituting a corresponding smaller token segment for a portion of the temporary card account identifier. In certain example embodiments, the token may be usable by the cardholder to initiate financial transactions against a corresponding financial account, but may first need to be transformed to the temporary card account identifier prior to transmission through a payment network or use by a core account processing system of a financial institution.

Referring again to FIG. 5 in conjunction with FIG. 3, at block 510, computer-executable instructions provided as part of, for example, the conditions for temporary use generation/determination module(s) 228 may be executed to establish one or more conditions for temporary use of the temporary card account identifier. Illustrative conditions for temporary use of the temporary card account identifier may include, but are not limited to, a time limit for use of the temporary card account identifier, a total funds withdrawal or transaction amount limit, a number of separate transactions permitted using the temporary card account identifier, a per-transaction funds withdrawal or transaction amount limit, a geographic constraint regarding where the temporary card account identifier may be used, a types of funds dispensing location (e.g., an ATM location) at which the temporary card account identifier may be used, and so forth. In certain example embodiments, after a condition for temporary use of the temporary card account identifier is no longer capable of being met (e.g., a threshold number of uses has been reached, a total transaction amount limit has been reached, the identifier has expired, etc.), the temporary card account identifier may be deactivated, potentially as part of a batch process.

The conditions for temporary use generation/determination module(s) 228 may be configured to access stored historical transaction information 325 associated with the cardholder or one or more financial accounts associated with the cardholder such as, for example, historical account balance information, historical transactional behavior patterns, or the like in order to establish one or more of the conditions for temporary use (e.g., monetary limits). The information 325 may form at least part of the historical transaction information 238 stored in the datastore(s) 234. In certain example embodiments, the historical transaction information for the cardholder may be requested from one or more other systems of the architecture 100 (e.g., the card issuer system 112, the customer service system 110, etc.).

Further, in certain example embodiments, various selectable options for certain conditions for temporary use (e.g., different total withdrawal limits, different per-transaction withdrawal limits, etc.) may be transmitted for presentation to the cardholder. Different transaction fees may be associated with different options such that a cardholder may be required to balance a higher transaction fee against, for example, a higher withdrawal limit.

The conditions for temporary use generation/determination module(s) 228 may be configured to perform the processing initiated at block 510 or may be configured to generate and submit a request to another system (e.g., the card issuer system 112) to perform the processing. In those embodiments in which the service provider system 118 is configured to perform the processing initiated at block 510, computer-executable instructions provided as part of, for example, the notification module(s) 232 may be executed to communicate, at block 512, an indication 335 of the temporary card account identifier and information indicative of the conditions for temporary use associated with the temporary card account identifier to the card issuer system 112 for association with the appropriate financial account of the cardholder.

Still referring to FIG. 5 in conjunction with FIG. 3, the operations of blocks 514 and 516 may be performed in order to identify one or more funds dispensing locations at which the cardholder 102 may utilize the temporary card account identifier to obtain access to funds. The operations of blocks 514 and 516 may be performed responsive to execution of computer-executable instructions provided as part of, for example, the funds dispensing location determination module(s) 228.

At block 514, a location associated with the cardholder may be identified. The cardholder's location may be identified in any number of suitable ways including, but not limited to, based on information 340 received from a user device being operated by the cardholder and which is indicative of a Global Positioning System (GPS) location of the user device. The GPS location information 340 may be received directly from the user device or via an intermediary system or device (e.g., the customer service system 110).

In other example embodiments, the cardholder's location may be identified based on location information 340 received on behalf of the cardholder in response to a location inquiry. For example, a cardholder 102 may provide his/her location via a telephone or instant messaging application interaction session with a CSR 106 or may provide input to the client application 305 indicative of the cardholder's location. Varying levels of precision may be specified for the cardholder's location. For example, as noted earlier, the cardholder's location may correspond to GPS coordinates of a user device operable by the cardholder or a complete street address specified by the cardholder, or in other example embodiments, may be a less precise location identifier such as a postal code (e.g., a zip code), city name, neighborhood identifier, or the like.

Upon identifying the cardholder's location at block 514, one or more funds dispensing locations may be identified based on the cardholder's location and one or more rules/constraints at block 516. The funds dispensing location determination module(s) 230 may be configured to access one or more of the datastore(s) 234 to retrieve information 345 indicative of funds dispensing location determination rules or constraints 244 to be utilized in determining one or more funds dispensing locations that are candidates for accepting transactions involving the temporary card account identifier.

An illustrative funds dispensing location determination rule may be, for example, a rule that specifies that a funds dispensing location must be within a threshold distance from the cardholder's location in order to be a candidate location at which the cardholder may obtain funds using temporary card account identifier. Another illustrative funds dispensing location determination rule may be, for example, a rule that specifies that funds dispensing locations associated with only certain types of funds dispensing systems are candidate locations for use. For example, a location determination rule may specify that the temporary card account identifier may only be used at a financial institution branch. Funds dispensing location determination rules/constraints may be established based on any of a variety of types of factors including, but not limited to, historical transactional activity or transactional patterns associated with the cardholder, funds dispensing capabilities of various funds dispensing locations, risk assessments associated with the cardholder, and so forth.

Upon identification of the one or more funds dispensing locations, various types of information 350 may be transmitted for presentation to the cardholder 102 at block 518. Such information may include, for example, the temporary card account identifier or a representation thereof and instructional information to assist the cardholder in using the temporary card account identifier. In various example embodiments, the temporary card account identifier may be transmitted separately from the instructional information. The operation of block 518 may be performed responsive to execution of computer-executable instructions provided as part of, for example, the notification module(s) 232. In certain example embodiments, a generated token corresponding to the temporary card account identifier may be transmitted to the cardholder in lieu of or in addition to the temporary card account identifier. As previously described, the token may use a broader character set and/or contain a less number of characters or digits than the temporary card account identifier, and thus, may be more likely to be remembered and entered accurately by the cardholder when attempting to obtain funds.

In certain example embodiments, the temporary card account identifier (or a corresponding token) may be presented to the cardholder via telephone or instant messaging application interaction with a CSR 106 or via an automated system such as an IVR system forming part of the service provider system 118 or one or more other systems of the architecture such as the customer service system 110.

In other example embodiments, a representation of the card account identifier (or of a corresponding token) may be transmitted for presentation to the cardholder. The representation may include, for example, a string of characters directly indicative of the card account identifier (or the token); a barcode, Quick Response (QR) code, or the like that encodes the card account identifier (or the token); or any other suitable type of representation. A funds dispensing system 116 associated with a funds dispensing location may include a reader or scanner configured to read/scan the barcode, QR code, or the like and identify the temporary card account identifier (or the token) encoded therein. The representation of the card account identifier (or the token) may be transmitted via an in-session, Web-based interaction with the cardholder 102 for presentation by, for example, the client application 305 or through a non-synchronous interaction such as in an electronic mail (e-mail) message or a Short Message Service (SMS) message.

The instructional information may be transmitted for presentation to the cardholder 102 via any of the mechanisms described above. The instructional information may include, but is not limited to, an indication of the conditions that govern use of the temporary card account identifier, instructions for activating the temporary card account identifier in order to enable its use (which may include generating authentication credentials such as a PIN), information associated with the one or more funds dispensing locations at which the card account identifier may be used to obtain access to funds, and so forth.

The instructions for generating authentication credentials may include, for example, instructions for contacting a CSR 106 or an automated system such as an IVR system in order to activate the temporary card account identifier for use and generate a PIN or other authentication token that must be provided to enable transactions involving the temporary card account identifier. In certain example embodiments, the cardholder may be required to provide various identifying information in order to authenticate himself prior to being permitted to establish the PIN for the temporary card account identifier, particularly in scenarios in which the cardholder seeks to activate the identifier at some point subsequent to receipt of the identifier. Further, in various example embodiments, the cardholder may be permitted to activate the temporary card account identifier and generate a PIN at a funds dispensing location.

In those example embodiments in which a token corresponding to a temporary use card account identifier is generated and communicated to a cardholder, the instructions for generating authentication credentials may include, for example, instructions for contacting a CSR 106 or an automated system such as an IVR system in order to activate the token for use and to generate a PIN or other authentication credentials that must be provided to enable transactions involving the token. For example, an IVR system may be configured to validate a shorter length token (e.g., an 11 digit token) instead of a longer length temporary use card account identifier (e.g., a 16 digit temporary use card account identifier). The IVR system may utilize a process similar to that described herein in connection with a funds dispensing system 116 to construct the temporary use card account identifier from the token. The IVR system may prompt a cardholder for entry of a first token segment (e.g., a first digit of the token) and a last token segment (e.g., a final portion of token such as the last 4 digits). The IVR system may then validate the token based on this received input. Less than the full token may be needed to validate the token because, in certain example embodiments, the combination of the first token segment and the last token segment may be unique for any given token. The IVR system may further prompt the user for additional authentication information (e.g., last 4 digits of a social security number) and, upon authentication, activate the token for use.

The cardholder may then have an opportunity to select a PIN or other authentication credentials for use in connection with the token.

The information associated with the funds dispensing location(s) presented to the cardholder 102 may identify a type of each location (e.g., ATM, POS, financial institution branch, etc.). The information may further be sorted or capable of being sorted by the cardholder 102 in accordance with any suitable parameter such as, for example, by a distance from the cardholder's location, by a type of location, or the like. Further, address information, contact information, one or more links to a map or directions from the cardholder's current location, or the like may be provided for each location.

FIG. 6 is a process flow diagram of an illustrative method 600 for applying a partial block to an existing card account identifier and establishing conditions for temporary use of the existing card account identifier in accordance with one or more example embodiments of the disclosure. In accordance with the method 600, the existing card account identifier serves as the card account identifier for temporary use, and the method 600 represents an alternative implementation to the method 500 depicted in FIG. 5.

Upon identification of the existing card account identifier at block 412, computer-executable instructions provided as part of, for example, the temporary/permanent card account identifier generation module(s) 226 may be executed to initiate processing to generate a new permanent card account identifier. The processing at block 602 to generate a new permanent card account identifier may be similar to the processing described in connection with block 504 of FIG. 5. As similarly described earlier, prior to initiating the processing at block 602, a check may first be performed to ensure that processing to generate a new permanent card account identifier has not already been initiated responsive, for example, to an automated fraud determination.

At block 604, computer-executable instructions provided as part of, for example, the conditions for temporary use generation/determination module(s) 228 may be executed to initiate processing to establish one or more conditions for temporary use of the existing card account identifier. The processing initiated at block 606 may be similar to that initiated at block 510 of FIG. 5, and the conditions for temporary use that are established may include any of those previously described. However, in certain example embodiments, the conditions for temporary use of the existing card account identifier may be more restrictive than those established for a temporary card account identifier if the existing card account identifier has potentially been compromised. The service provider system 118 may leverage a fraud rules system that may form part of the service provider system 118 or another system (e.g., the card issuer system 112) in order to establish the conditions for temporary use based on one or more fraud mitigation rules.

As a non-limiting example, the conditions for temporary use of the existing card account identifier may be as restrictive as permitting only a one-time use of the existing card account identifier. The conditions for temporary use of the existing card account identifier may further include a shorter time period until expiration, a lower transaction amount limit, and more use constraints (e.g., only PIN-based transactions, only financial institution branch transactions, etc.) than in the implementation involving the temporary card account identifier. In certain example embodiments, after a condition for temporary use of the existing card account identifier is no longer capable of being met (e.g., the identifier has already been used in a transaction, a total transaction amount limit has been reached, the identifier has expired, etc.), the existing card account identifier may be deactivated and disassociated from the cardholder's financial account. A complete block of the existing card account identifier may first be applied prior to deactivation.

At block 606, computer-executable instructions provided as part of, for example, the card account identifier blocking module(s) 224 may be executed to initiate processing to apply a partial block to the existing card account identifier. The partial block may be applied based on the established conditions for temporary use such that future use of the existing card account identifier is restricted to scenarios in which such conditions are satisfied.

In those embodiments in which the service provider system is configured to perform the processing initiated at block 602 and/or blocks 604-606, computer-executable instructions provided as part of, for example, the notification module(s) 232 may be executed to communicate, at block 608, an indication of the newly generated permanent card account identifier and/or an indication of the conditions for temporary use of the existing card account identifier to the card issuer system 112 for association with the appropriate financial account of the cardholder.

At block 610, a location associated with the cardholder may be identified. Any of the description provided earlier with respect to block 514 of FIG. 5 may apply to the identification of the cardholder's location at block 610. At block 612, one or more funds dispensing locations may be identified based on the cardholder's location and one or more funds dispensing location rules/constraints. Any of the description provided earlier with respect to block 516 of FIG. 5 may apply to the identification of one or more funds dispensing locations at block 612.

At block 614, the existing card account identifier or a representation thereof and instructional information to assist the cardholder in using the existing card account identifier may be transmitted for presentation to the cardholder. In a similar way as described in reference to FIG. 5, in certain example embodiments, a token corresponding to the existing card account identifier may be generated and provided to the cardholder in lieu of or in addition to the existing card account identifier. The representation of the existing card account identifier (or the token) may take on any of the forms described with respect to block 518 of FIG. 5. The existing card account identifier or the representation thereof (or the token or representation thereof) may be transmitted to the cardholder because the cardholder may not have access to the identifier, particularly in those scenarios in which a payment or funds access card encoding the identifier has been lost or stolen. Further, any of the types of instructional information described with respect to the operation of block 518 may be transmitted at block 614. In certain example embodiments, instructions for activating the existing card identifier and/or generating a PIN or other authentication token may not be transmitted because the existing card account identifier may still be active (albeit under restrictions conditions for use) and the existing PIN may still be used. In other example embodiments, a cardholder may be required to generate a new PIN for use of the existing card account identifier in accordance with the conditions for temporary use in order to mitigate risk associated with use of the existing card account identifier. In such example embodiments, use of the existing card account identifier with the existing PIN may be blocked even in those instances in which other conditions for temporary use of the existing card account identifier are satisfied. The operation of block 614 may be performed responsive to execution of computer-executable instructions provided as part of, for example, the notification module(s) 232.

FIG. 7 is a process flow diagram of an illustrative method 700 for applying a block to an existing card account identifier, generating a new card account identifier, and establishing initial conditions for temporary use of the new card account identifier in accordance with one or more example embodiments of the disclosure. In accordance with the method 700, the newly generated permanent card account identifier serves as the card account identifier for temporary use, and the method 700 represents an alternative implementation to the method 500 depicted in FIG. 5 and the method 600 depicted in FIG. 6.

Upon identification of the existing card account identifier at block 412, computer-executable instructions provided as part of, for example, the card account identifier blocking module(s) 224 may be executed to initiate, at block 702, processing to apply a block to the existing card account identifier. The block applied to the existing card account identifier as part of the processing of method 700 may be similar to the block applied to existing card account identifier as part of the processing of method 500 in block 502. As similarly described earlier, prior to initiating the processing at block 702, a check may first be performed to ensure that processing to apply a block to the existing card account identifier has not already been initiated responsive, for example, to an automated fraud determination.

At block 704, computer-executable instructions provided as part of, for example, the temporary/permanent card account identifier generation module(s) 226 may be executed to initiate processing to generate a new permanent card account identifier. Processing initiated at block 704 may correspond to the processing initiated at block 504 of FIG. 5 and/or processing initiated at block 602 of FIG. 6. As similarly described earlier, prior to initiating the processing at block 704, a check may first be performed to ensure that processing to generate a new permanent card account identifier has not already been initiated responsive, for example, to an automated fraud determination.

At block 706, computer-executable instructions provided as part of, for example, the conditions for temporary use generation/determination module(s) 228 may be executed to initiate processing to establish one or more initial conditions for temporary use of the new permanent card account identifier. The initial conditions for temporary use of the new permanent card account identifier may include any of the illustrative conditions for temporary use previously described. However, in certain example embodiments, and similar to the implementation in which the existing card account identifier serves as the card account identifier for temporary use, the initial conditions for temporary use of the new permanent card account identifier may be more restrictive than those established for a temporary card account identifier in order to guard against potential abuse. The service provider system 118 may leverage a fraud rules system that may form part of the service provider system 118 or another system (e.g., the card issuer system 112) in order to establish the initial conditions for temporary use based on one or more fraud mitigation rules. In certain example embodiments, after an initial condition for temporary use of the new permanent card account identifier is no longer capable of being met (e.g., the identifier has already been used in a transaction, a total transaction amount limit has been reached, the identifier has expired, etc.), a block may be applied to the permanent card account identifier preventing future use of the identifier until a physical card encoding the identifier is received and activated, at which point the block may be removed.

In those embodiments in which the service provider system is configured to perform the processing initiated at blocks 704 and 706, computer-executable instructions provided as part of, for example, the notification module(s) 232 may be executed to communicate, at block 708, an indication of the newly generated permanent card account identifier and an indication of the initial conditions for temporary use of the new permanent card account identifier to the card issuer system 112 for association with the appropriate financial account of the cardholder.

At block 710, a location associated with the cardholder may be identified. Any of the description provided earlier with respect to block 514 of FIG. 5 may apply to the identification of the cardholder's location at block 710. At block 712, one or more funds dispensing locations may be identified based on the cardholder's location and one or more funds dispensing location rules/constraints. Any of the description provided earlier with respect to block 516 of FIG. 5 may apply to the identification of one or more funds dispensing locations at block 712.

At block 714, the new permanent card account identifier or a representation thereof and instructional information to assist the cardholder in using the new permanent card account identifier in accordance with the initial conditions for temporary use may be transmitted for presentation to the cardholder. In a similar way as described in reference to FIG. 5, in certain example embodiments, a token corresponding to the existing card account identifier may be generated and provided to the cardholder in lieu of or in addition to the existing card account identifier. The representation of the new permanent card account identifier (or the token) may take on any of the forms described with respect to block 518 of FIG. 5. Further, any of the types of instructional information described with respect to the operation of block 518 may be transmitted at block 714. The operation of block 714 may be performed responsive to execution of computer-executable instructions provided as part of, for example, the notification module(s) 232.

In certain example embodiments, the instructional information may include instructions for activating the new permanent card account identifier for temporary use and/or generating a PIN or other authentication token. Activation of the permanent card account identifier for temporary use and full activation of the permanent card account identifier upon receipt of a physical card may require different processing paths that may be supported, for example, by providing the cardholder two different telephone numbers to call for the different activations. As previously noted, after initial temporary conditions for use of the permanent card account identifier are no longer satisfied, a block may be applied to the identifier until activation after receipt of the physical card, at which point, any blocks present on the identifier may need to be removed, reset, or the like. In certain example embodiments, upon full activation of the permanent card account identifier, the cardholder may be permitted to continue to use a previously established PIN, while in other embodiments, the cardholder may be required to establish a new PIN.

Figure 8A:
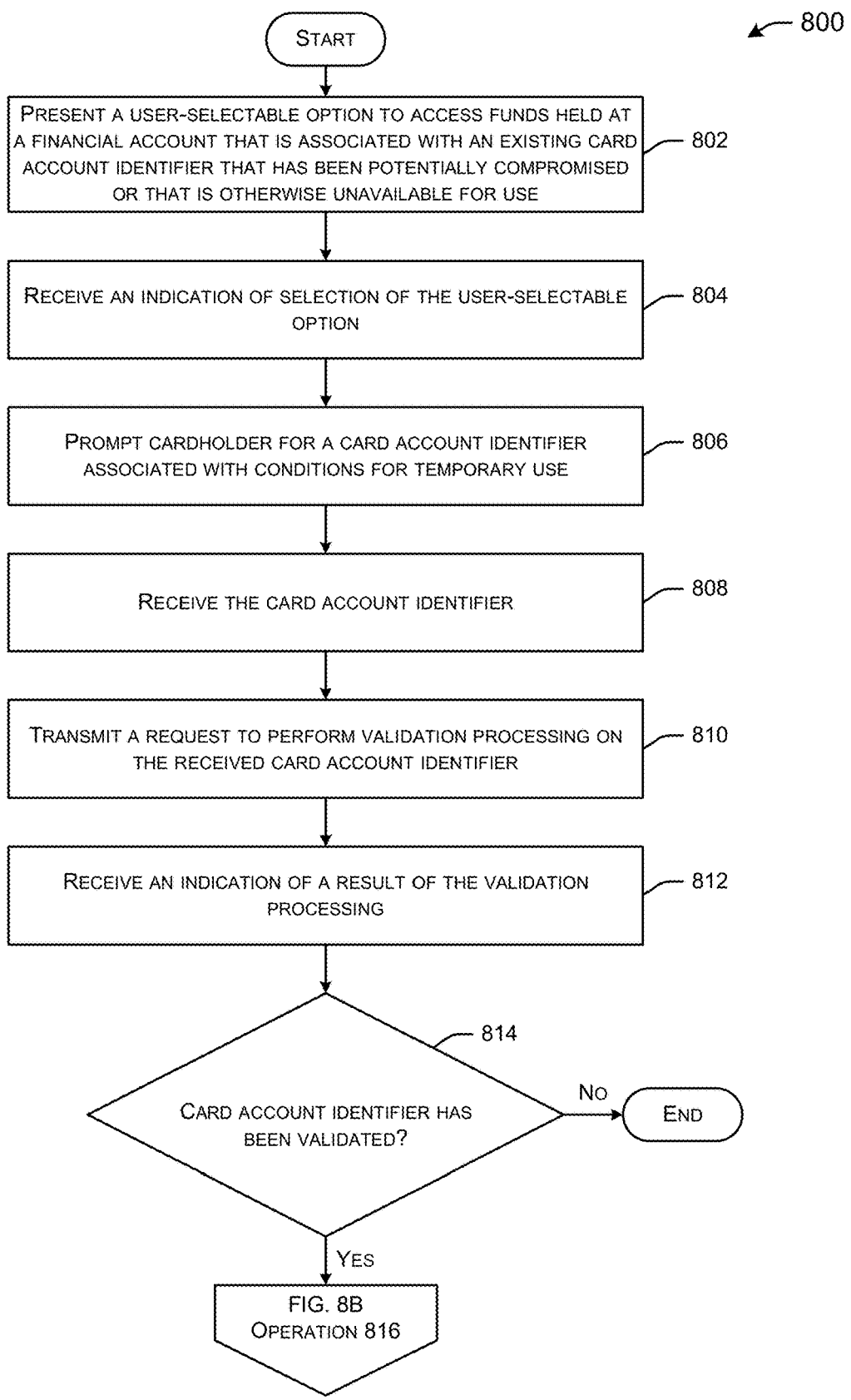
FIGS. 8A-8C are process flow diagrams of an illustrative method for processing a request to access funds based on a card account identifier associated with conditions for temporary use in accordance with one or more example embodiments of the disclosure.
Figure 8B:
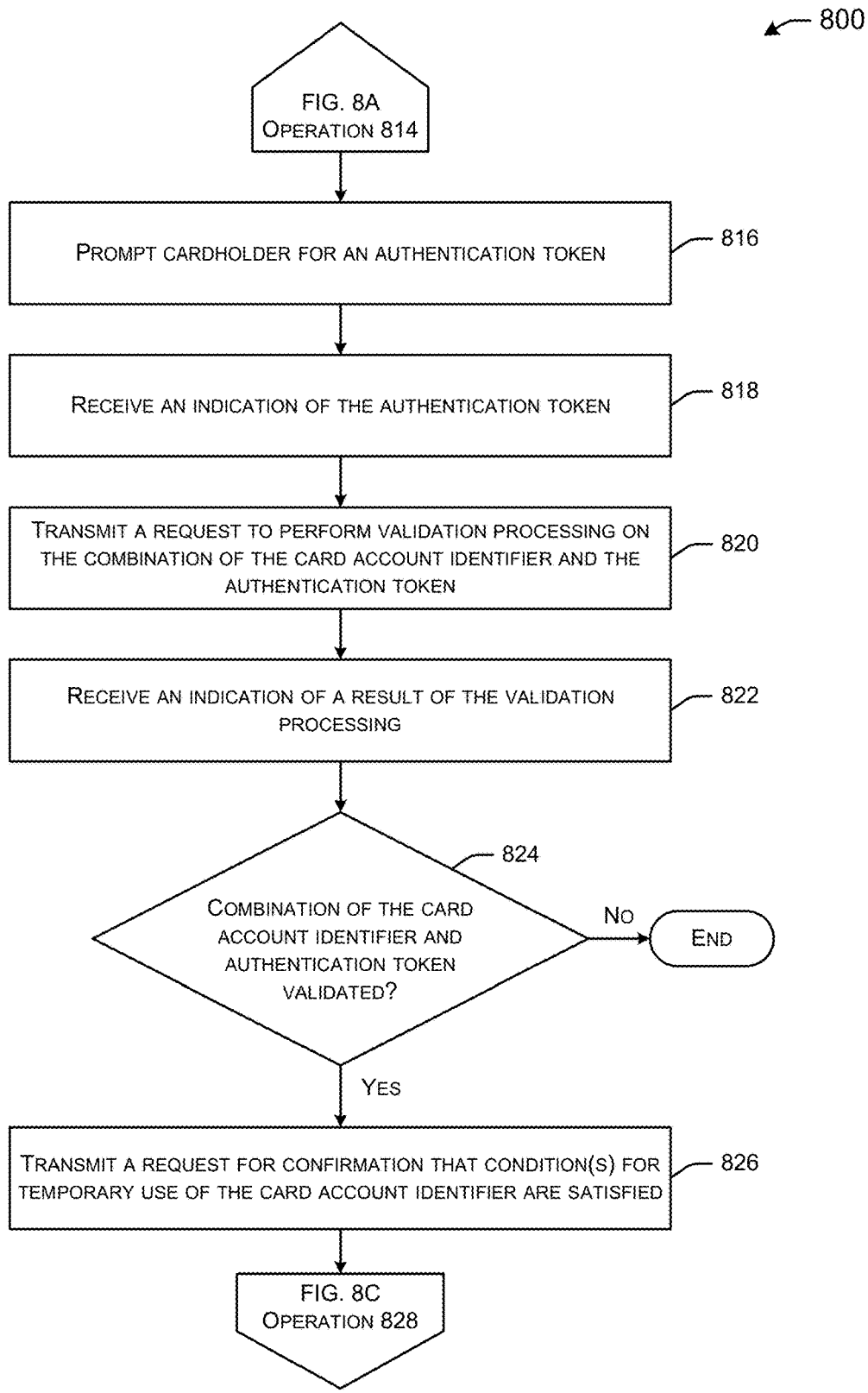
Figure 8C:
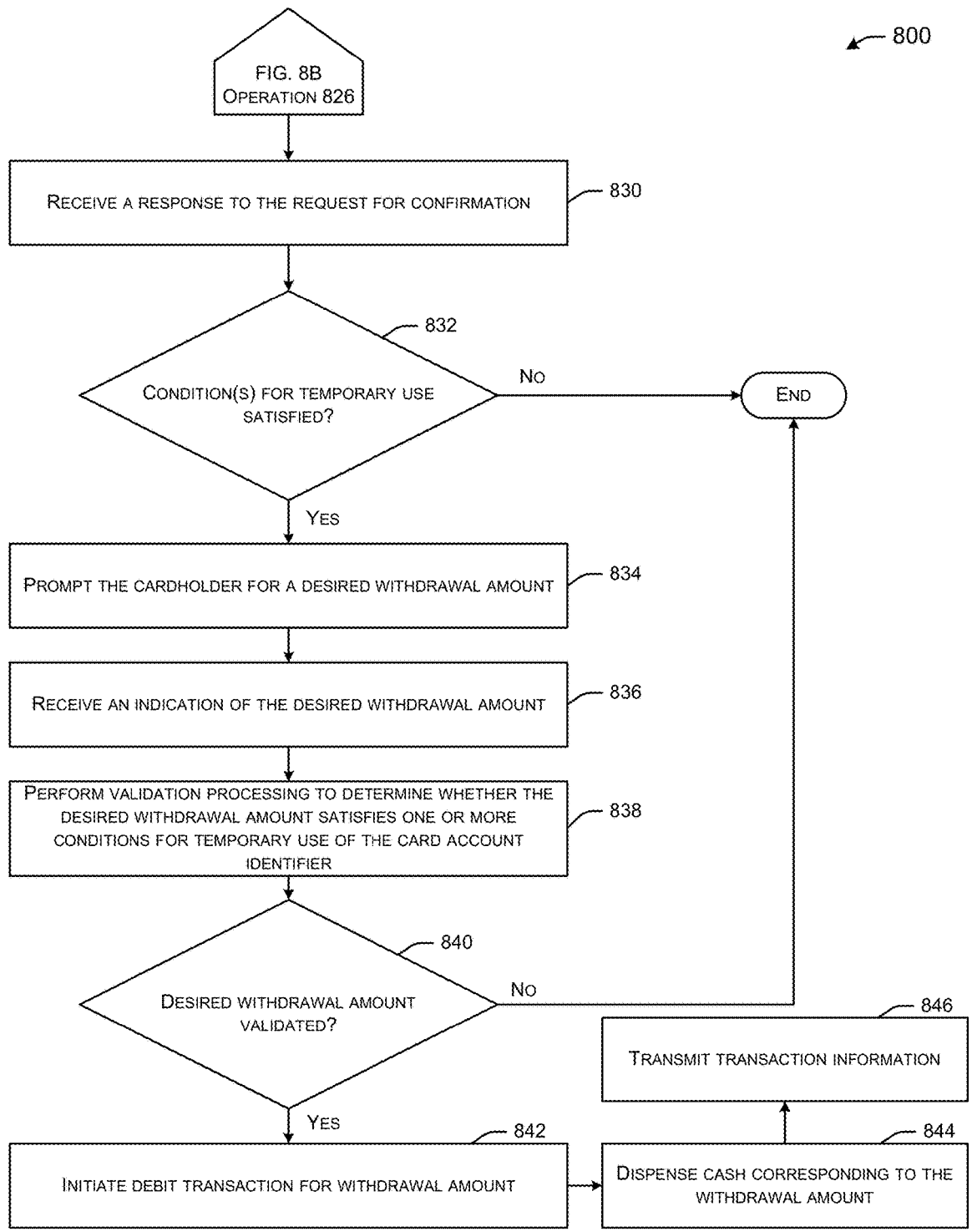

FIGS. 8A-8C are process flow diagrams of an illustrative method 800 for receiving, at a funds dispensing location, a request to access funds based on a card account identifier associated with conditions for temporary use and processing the request in accordance with one or more example embodiments of the disclosure. One or more operations of the method 800 may be performed by the funds dispensing system 116 associated with a particular funds dispensing location. While the illustrative method 800 may be described in connection with an ATM or POS funds dispensing location and associated system, it should be appreciated that the processing may be applicable to any suitable funds dispensing location/system.

Referring to FIG. 8A, at block 802, a user-selectable option may be presented to a cardholder to access funds held at a financial account associated with an existing card account identifier that has been potentially compromised or that is otherwise unavailable for use. The user-selectable option may be presented to the cardholder via one or more user interfaces of a funds dispensing system 116 associated with a funds dispensing location. The funds dispensing system 116 may include, for example, an ATM machine or POS device present at the funds dispensing location. The user interface(s) may include a display, a haptic interface, a speaker, or the like that is capable of presenting the option to the cardholder in some manner. The user may be the cardholder or a user of the funds dispensing system acting on behalf of the cardholder such as, for example, a cashier at a POS terminal, a teller at a financial institution branch, and so forth.

At block 804, the funds dispensing system may receive an indication of a selection by or on behalf of the cardholder of the option presented at block 802. As a non-limiting example, the cardholder may supply input to the ATM machine or POS device indicative of the selection by interacting with a touch display or push-button interface thereof. As another non-limiting example, the ATM machine or POS device may be configured with voice recognition software and the cardholder may indicate his/her selection by providing voice commands. As yet another non-limiting example, the cardholder may indicate his/her selection via a proxy (e.g., by instructing an attendant, a cashier, a financial institution teller, or the like of his/her desire to obtain funds using a card account identifier associated with conditions for temporary use). The proxy may then input information to the funds dispensing system on behalf of the cardholder. It should be appreciated that the above examples are merely illustrative and not exhaustive.

At block 806, the funds dispensing system 116 (or more specifically the ATM machine, the POS device, the financial institution branch teller, or the like) may prompt the cardholder for a card account identifier associated with temporary conditions for use and at block 808 the funds dispensing system may receive the card account identifier.

The cardholder may input the card account identifier via a physical or virtual keypad of the ATM machine or POS device, or may provide the identifier to a proxy (e.g., attendant, cashier, financial institution branch teller), who may input the identifier to a local computing device. As previously described, the card account identifier may be a temporary card account identifier associated with conditions for temporary use, an existing card account identifier associated with temporary conditions for use, or a new permanent card account identifier associated with initial conditions for temporary use.

The card account identifier associated with conditions for temporary use may be a combination of alphanumeric or numeric only characters and may be equivalent in length to a standard card account identifier. In certain example embodiments, such as those in which the card account identifier is a temporary card account identifier, the identifier may be of a different length than the standard length and may include a particular combination of characters that indicates that the identifier is one that is associated with temporary conditions for use. In such embodiments, it may not be necessary to receive the selection at block 804 as the receipt of the card account identifier itself may identify the transaction request as a request for access to funds based on a card account identifier associated with conditions for temporary use.

Further, in certain example embodiments, the ATM machine, POS device, or other computing device may include or may be in communication with a scanner, reader, or the like that is configured to read a representation of the card account identifier such as, for example, a character string, a barcode, a QR code, or the like that encodes the card account identifier.

At block 810, the funds dispensing system 116 may transmit a request to perform validation processing on the received card account identifier in order to ensure that the identifier is valid. The request may be transmitted to one or more other systems of the architecture 100 such as, for example, the customer service system 110, the card issuer system 112, or the service provider system 118. In certain example embodiments, the validation processing requested at block 810 may further include processing to determine whether conditions for temporary use associated with the identifier are satisfied. In such embodiments, a request may be submitted to the card issuer system 112 (or more specifically a core account processing system, a fraud rules system, or the like forming part of the card issuer system 112) in order to determine whether conditions for temporary use are satisfied. The request may be submitted as a transaction to a payment network provider system 114 for transmission to the card issuer system 112.

At block 812, the funds dispensing system 116 may receive an indication of a result of the validation processing requested at block 810. At block 814, a determination may be made as to whether the received card account identifier has been validated based on the indication received at block 812. If it is determined that the received card account identifier has not been validated, the method 800 may end. On the other hand, in response to a positive determination at block 814, the method 800 may proceed to block 816.

Referring now to FIG. 8B, at block 816, the ATM machine, POS device, financial institution teller, or the like may prompt the cardholder for an authentication token. At block 818, an indication of the authentication token may be received. In certain example embodiments, the authentication token may be a PIN. The PIN may be a combination of alphanumeric or numeric only characters and may be received from the cardholder via input provided to a touch panel interface (e.g., a virtual keypad), input provided using a push-button interface (e.g., a physical keypad), voice input, or in any other suitable manner. While a PIN is illustratively described, any suitable authentication token having any suitable form may be used.

At block 820, the funds dispensing system 116 (e.g., the ATM machine, POS device, a computing device operated by a financial institution teller, etc.) may transmit a request to perform validation processing on the combination of the card account identifier and the authentication token. The request may be transmitted to one or more other systems of the architecture 100 such as, for example, the customer service system 110, the card issuer system 112, or the service provider system 118. In certain example embodiments, the request may be submitted to the card issuer system 112 (or more specifically a core account processing system, a fraud rules system, or the like forming part of the card issuer system 112) in order to determine whether the received authentication token is associated with the received card account identifier. The request may be submitted as a transaction to a payment network provider system 114 for transmission to the card issuer system 112.

At block 822, the funds dispensing system 116 may receive an indication of the result of the validation processing requested at block 820. At block 824, a determination may be made as to whether the combination of the authentication token and the received card account identifier has been validated based on the indication received at block 822. If it is determined that the combination of the authentication token and the received card account identifier has not been validated, the method 800 may end. On the other hand, in response to a positive determination at block 824, the method 800 may proceed to block 826.

If not previously requested and confirmed, the funds dispensing system 116 may, at block 826, transmit a request for confirmation that all conditions for temporary use of the received card account identifier are satisfied. The request may be transmitted to one or more other systems of the architecture 100 such as, for example, the customer service system 110, the card issuer system 112, or the service provider system 118. For example, the request may be submitted to the card issuer system 112 (or more specifically a core account processing system, a fraud rules system, or the like forming part of the card issuer system 112) in order to determine whether conditions for temporary use are satisfied. The request may be submitted as a transaction to a payment network provider system 114 for transmission to the card issuer system 112.

Referring now to FIG. 8C, the funds dispensing system 116 may receive a response to the request for confirmation at block 828. At block 830, a determination may be made as to whether the response received at block 828 indicates that conditions for temporary use associated with the received card account identifier are satisfied. As previously noted, such conditions for temporary use may include restrictions on the number of permitted transactions, a time limit in which a transaction must be requested, funds amount limits for transactions, and so forth, as well as, geographic constraints. In response to a negative determination at block 830, the method 800 may end. For example, the account identifier may have expired, the total funds withdrawal limit have been reached, and so forth.

On the other hand, if the response received at block 828 indicates the associated conditions for temporary use of the received card account are satisfied, the method 800 may proceed to block 832, where the funds dispensing system 116 may prompt the cardholder for a withdrawal amount. In certain example embodiments, a total allowable remaining withdrawal amount may be presented to the cardholder. Further, in various example embodiments, an anticipated transaction fee or a set of transaction fees for different withdrawal amounts may be presented to the cardholder.

At block 834, the funds dispensing system 116 may receive an indication of the desired withdrawal amount. The desired withdrawal amount may include any of i) cash withdrawal, ii) a purchase, or iii) a combination of a cash withdrawal and a purchase depending on the functionality supported by the funds dispensing system 116. The desired withdrawal amount may be indicated by the cardholder via one or more user interfaces (e.g., a virtual keypad, a physical keypad, voice input, etc.) of an ATM machine, POS device, etc. of the funds dispensing system 116.

At block 836, the funds dispensing system 116 may perform validation processing to determine whether the requested withdrawal limit satisfies one or more associated conditions for temporary use. For example, the funds dispensing system 116 may have previously received information identifying a total amount of funds remaining that are eligible for withdrawal using the received card account identifier, a per-transaction withdrawal limit, or the like. In other example embodiments, the funds dispensing system 116 may communicate a request to one or more other systems of the architecture 100 such as, for example, the customer service system 110, the card issuer system 112, or the service provider system 118 to perform the validation processing of block 836.

At block 838, a determination may be made as to whether the desired withdrawal amount has been validated based on the validation processing of block 836. In response to a negative determination at block 838, the method 800 may end. Responsive to a positive determination at block 838, the method 800 may proceed to block 840 where the funds dispensing system 116 may initiate a debit transaction for the desired withdrawal amount using the received card account identifier. The debit transaction may be transmitted to a payment network provider system 114 that supports a payment network with which the card issuer is associated. The debit transaction may be for an amount equal either to the desired withdrawal amount or to the desired withdrawal amount and a transaction fee.

At block 842, cash may be dispensed to the cardholder in an amount equal to the desired withdrawal amount. In other example embodiments, such as those only involving purchase transactions, cash may not be dispensed. At block 844, the funds dispensing system 116 may be configured to transmit transaction information to one or more other systems of the architecture 100 so that stored information associated with the conditions for temporary use (e.g., the number of uses of the card account identifier, the total amounts of funds withdrawn using the card account identifier, the remaining amount of funds available for dispensing using the card account identifier, etc.) may be appropriately incremented, decremented, or otherwise updated.

It should be noted that responsive to an end of the processing of method 800 based on a negative determination resulting from failure to validate the card account identifier and/or authentication token, failure to satisfy temporary use condition(s), or the like, a decline message may be communicated to the cardholder, potentially via a user interface of the funds dispensing system 116. In certain example embodiments, the decline message may provide an indication of a reason for declining the funds withdrawal. In other example embodiments, a reason may not be provided due to security concerns.

Figure 9:
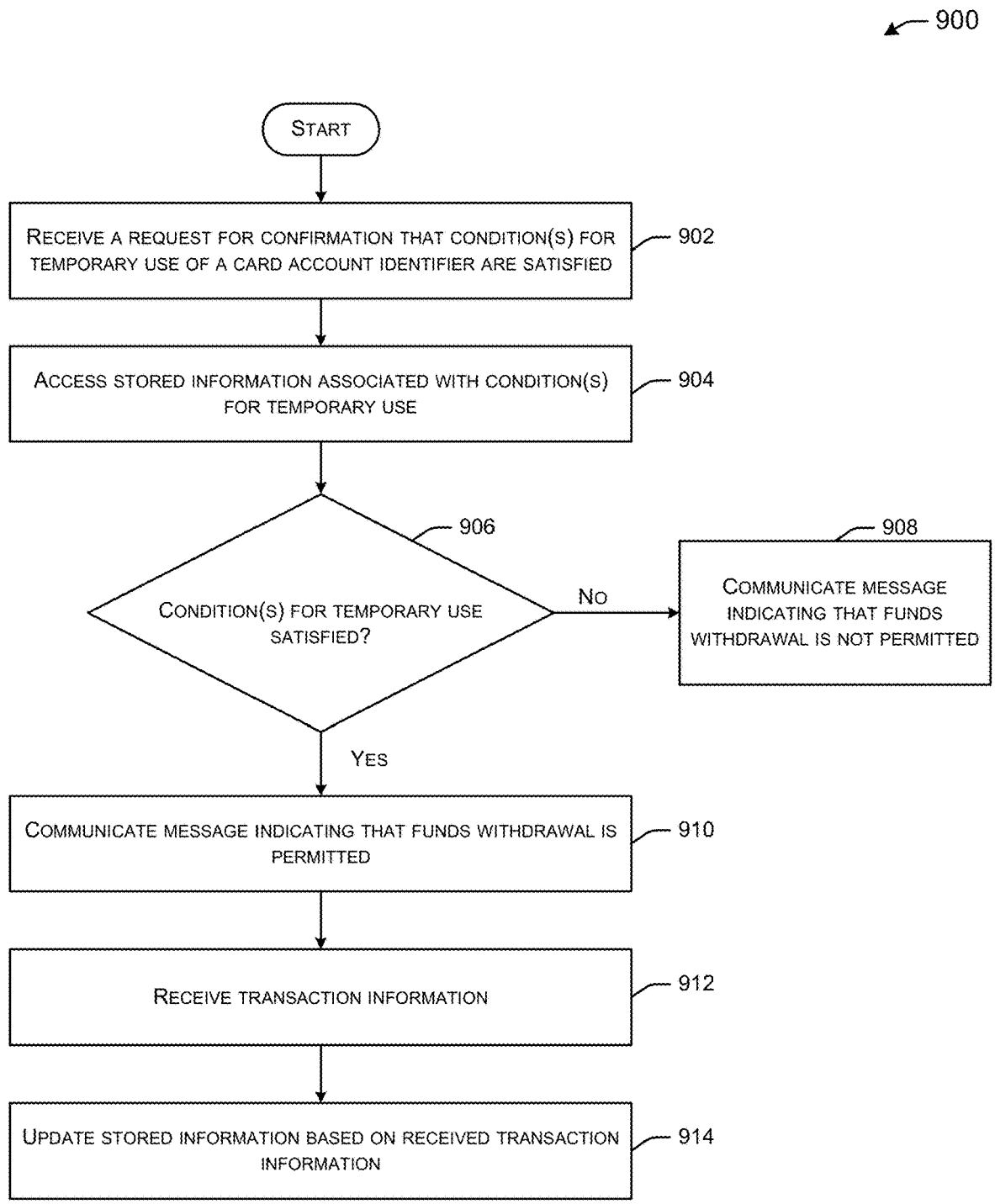
FIG. 9 is a process flow diagram of an illustrative method for determining whether conditions for temporary use of a card account identifier are satisfied in accordance with one or more example embodiments of the disclosure.

FIG. 9 is a process flow diagram of an illustrative method for 900 determining whether conditions for temporary use of a card account identifier are satisfied in accordance with one or more example embodiments of the disclosure. The operations of the method 900 will be described as being performed by program modules executing on service provider computer(s) 138/202 of the service provider system 118; however, it should be appreciated that one or more operations of the method 900 may be performed, at least in part, by the card issuer system 112 and/or the customer service system 110.

At block 902, a request for confirmation that conditions for temporary use of a card account identifier are satisfied may be received from a funds dispensing system 116. The request may include an indication of the card account identifier, and optionally, authentication credentials. Further, in certain example embodiments, the request may further include identifying information associated with the funds dispensing location such as, for example, an address of the funds dispensing location, an indication of the type of funds dispensing location (e.g., ATM, POS, etc.), and so forth.

At block 904, computer-executable instructions provided as part of, for example, the conditions for temporary use generation/determination module(s) 228 may be executed to access stored information 242 relating to the conditions for temporary use. The stored information 242 may identify the conditions for temporary use (e.g., a maximum number of transactions allowed using the card account identifier, a maximum allowable withdrawal amount across all transactions using the card account identifier, geographic constraints on where the card account identifier may be used to request a transaction, rules constraining use of the card account identifier to specific funds dispensing location(s) and/or specific types of funds dispensing location(s), etc.). The stored information 242 may further indicate related status information such as, for example, a number of transactions requested/executed that involve the card account identifier, a total amount of all transactions made involving the card account identifier, and so forth.

At block 906, a determination may be made as to whether the conditions for temporary use are satisfied. The determination at block 906 may be based on a comparison of the status information (and potentially identifying information received from the funds dispensing system 116) to the conditions for temporary use. In response to a negative determination at block 906, a message may be communicated to the funds dispensing system 116 indicating that transactions involving the card account identifier are not permitted. It should be appreciated that in various example embodiments, if a particular condition exception responsible for the negative determination is cured (e.g., a location exception), the card account identifier may be usable in connection with a subsequent financial transaction request. In response to a positive determination at block 906, the method 900 may proceed to block 908, where a message may be communicated to the funds dispensing system 116 indicating that at least one transaction involving the card account identifier is permitted.

Assuming that a transaction (e.g., a funds withdrawal) is completed using the card account identifier, the funds dispensing system 116 may transmit transaction information, which may be received at block 912. At block 914, the stored status information 242 may be updated based on the received transaction information.

Figure 10:
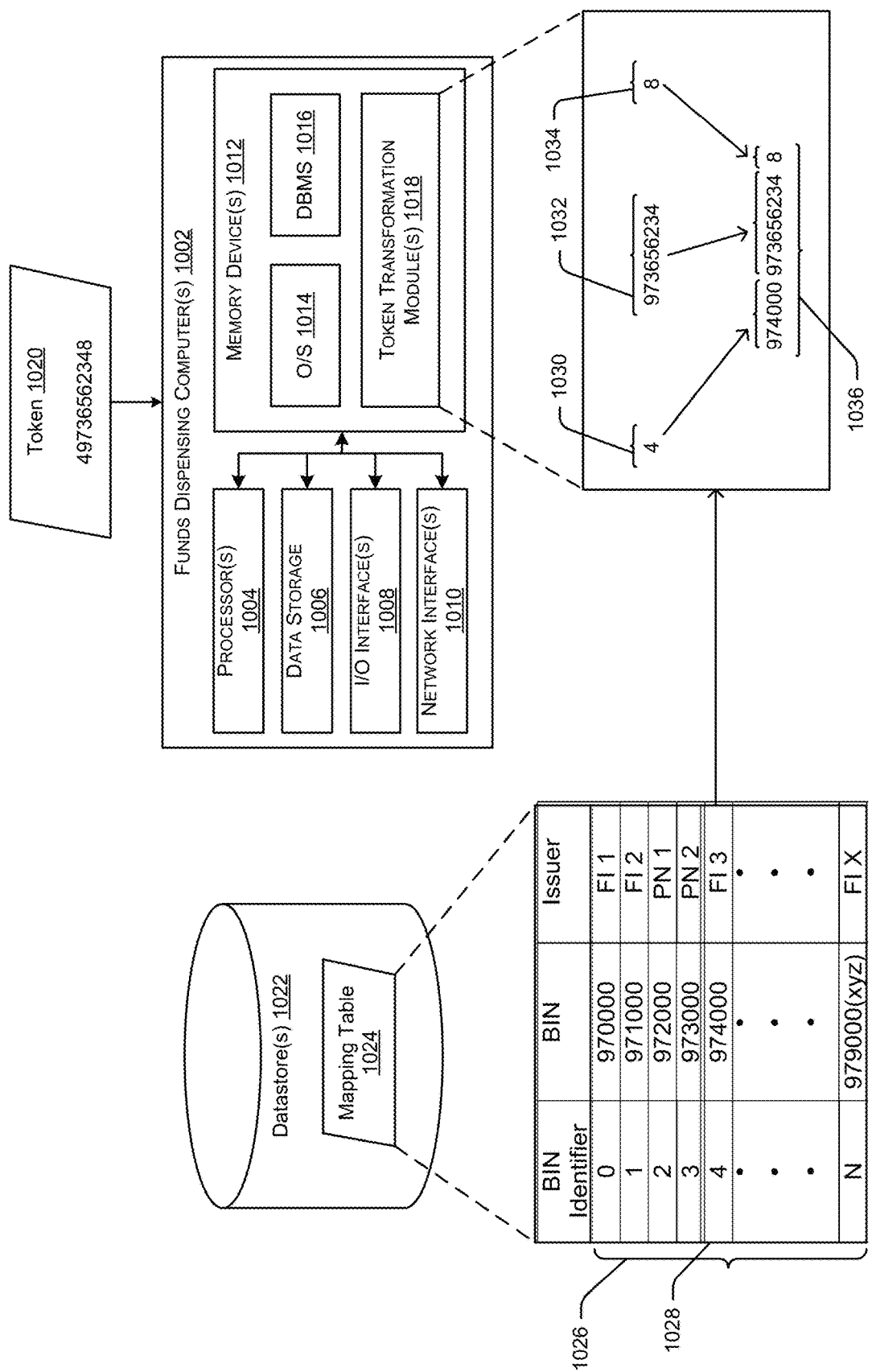
FIG. 10 is a schematic block diagram of an illustrative funds dispensing computer and illustrative processing that may be performed by the funds dispensing computer to construct a temporary use card account identifier from a corresponding token in accordance with one or more example embodiments of the disclosure.
Figure 11:
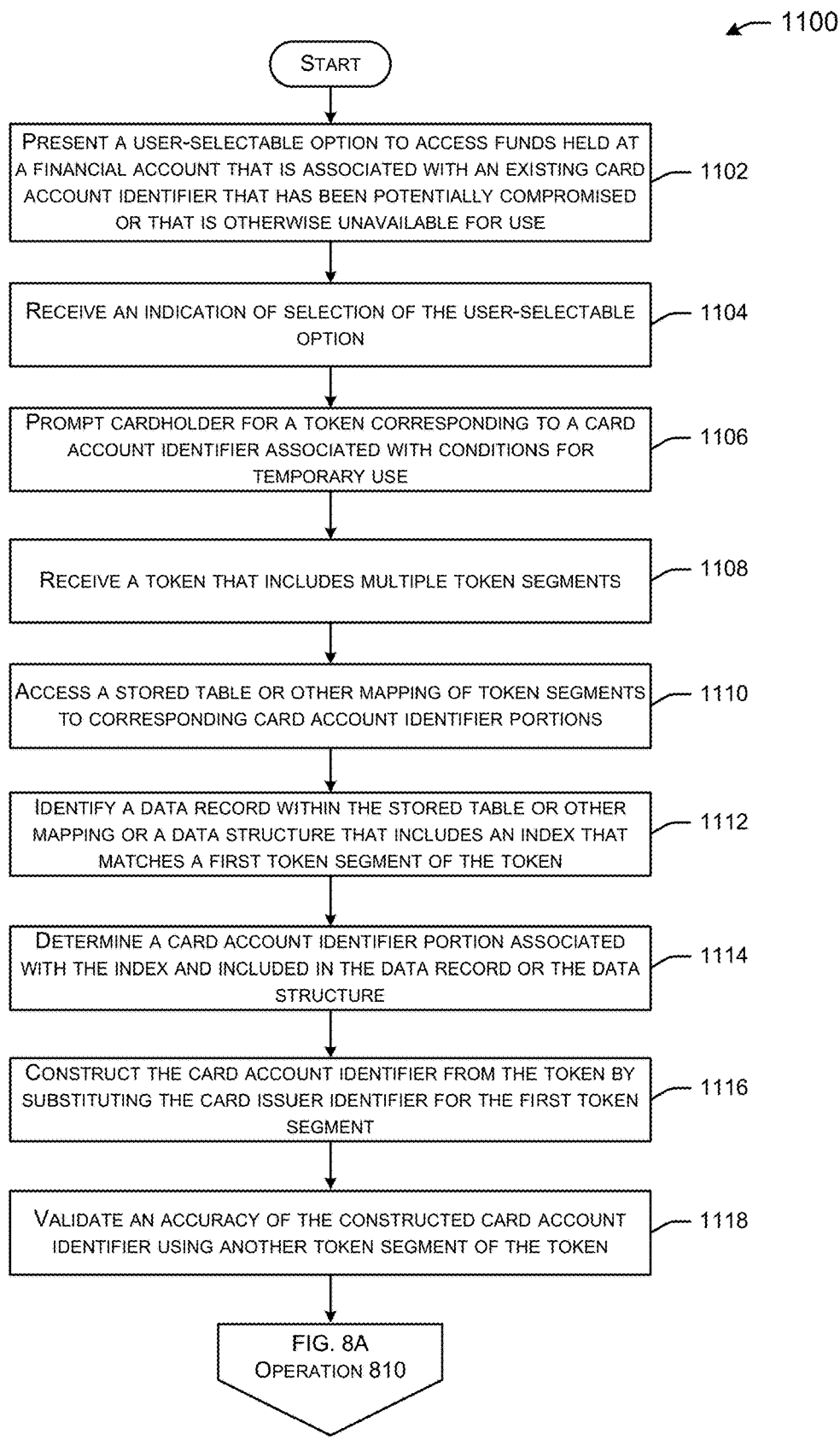
FIG. 11 is a process flow diagram of an illustrative method for constructing a temporary use card account identifier from a corresponding token in accordance with one or more example embodiments of the disclosure.

FIG. 10 is a schematic block diagram of an illustrative funds dispensing computer 1002 and illustrative processing that may be performed by the funds dispensing computer to transform a received token to a corresponding card account identifier in accordance with one or more example embodiments of the disclosure. FIG. 11 is a process flow diagram of an illustrative method 1100 for transforming a received token to a corresponding card account identifier in accordance with one or more example embodiments of the disclosure. While the illustrative method 1100 may be described in connection with an ATM or POS funds dispensing location and associated system, it should be appreciated that the processing may be applicable to any suitable funds dispensing location/system. FIGS. 10 and 11 will be described in conjunction with one another hereinafter. Further, transformation of a token to a corresponding card account identifier may be interchangeably described herein as construction of the card account identifier from the token.

Referring first to FIG. 10, the funds dispensing computer 1002 may correspond to one or more of the funds dispensing computer(s) 134 in one or more example embodiments. Although the funds dispensing computer 1002 will be described in the following discussion as being configured to perform various types of processing, it should be appreciated that any one or more aspects of the processing may be distributed across multiple funds dispensing computers 1002 (e.g., multiple funds dispensing computers 134). Further, in various example embodiments of the disclosure, one or more other systems of the architecture 100 (e.g., the customer service system 110, the card issuer system 112, etc.) may be configured to perform any one or more aspects of the processing described as being performed by the funds dispensing computer 1002. As such, any one or more program modules depicted in FIG. 10 as being executable by the funds dispensing computer 1002 may, in various example embodiments, be distributed across multiple funds dispensing computers 1002 and/or other systems, devices or components of the architecture 100.

In an illustrative configuration, the funds dispensing computer 1002 may include one or more processors (processor(s)) 1004, one or more memory devices 1012 (generically referred to herein as memory 1012), additional data storage 1006, one or more input/output ("I/O") interface(s) 1008, and/or one or more network interface(s) 1010. These various components will be described in more detail hereinafter.

The memory 1012 of the funds dispensing computer 1002 may include volatile memory (memory that maintains its state when supplied with power) such as random access memory (RAM) and/or non-volatile memory (memory that maintains its state even when not supplied with power) such as read-only memory (ROM), flash memory, and so forth. In various implementations, the memory 1012 may include multiple different types of memory, such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1012 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The memory 1012 may store computer-executable instructions that are loadable and executable by the processor(s) 1004, as well as data manipulated and/or generated by the processor(s) 1004 during the execution of the computer-executable instructions. For example, the memory 1012 may store one or more operating systems (O/S) 1014; one or more database management systems (DBMS) 1016; and one or more program modules, applications, or the like such as, for example, one or more token transformation modules 1018.

It should be appreciated that the program modules depicted in FIG. 10 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the funds dispensing computer(s) 1002 and/or hosted on remote computing devices accessible via one or more of the network(s) 120 may be provided to support additional functionality (e.g., customer service system 110 functionality) and/or functionality provided by the program modules depicted in FIG. 10. Further, functionality may be modularized differently such that processing described as being supported by the collection of program modules depicted may be performed by a fewer of greater number of modules. In addition, program modules that support the functionality described herein may form part of one or more applications executable across any number of systems or devices of architecture 100 in accordance with any suitable computing model such as, for example, a client-server model, a peer-to-peer model, and so forth. Functionality supported by the various program modules of the funds dispensing computer 1002 will be described in more detail through reference to FIG. 11.

The various illustrative program modules depicted as being loaded into the memory 1012 may include computer-executable instructions that in response to execution by the processor(s) 1014 cause various processing to be performed. In order to perform such processing, the program modules may utilize various data/information stored in the memory 1012, in the data storage 1006, and/or in the datastore(s) 1022. Further, while not depicted in FIG. 10, any of the data stored in the datastore(s) 1002 or the data storage 1006 may be loaded into the memory 1012 as well.

Referring now to other illustrative components of the funds dispensing computer 1002, the (O/S) 1014 loaded into the memory 1012 may provide an interface between other application software executing on the funds dispensing computer 202 and hardware resources of the service provider computer 202. More specifically, the O/S 1014 may include a set of computer-executable instructions for managing hardware resources of the funds dispensing computer 1002 and for providing common services to other application programs (e.g., managing memory allocation among various application programs). The O/S 1014 may include, for example, an operating system tailored to perform specialized tasks of an ATM, POS device, or other similar funds dispensing computer 1002.

As previously noted, the funds dispensing computer 1002 may further include data storage 1006 such as removable storage and/or non-removable storage including, but not limited to, magnetic storage, optical disk storage, and/or tape storage. In certain example embodiments, the data storage 1006 may include network-accessible storage. Data storage 1006 may provide non-transient storage of computer-executable instructions and other data. The data storage 1006 may include storage that is internal and/or external to the funds dispensing computer 1002. The memory 1012 and/or the data storage 1006, removable and/or non-removable, are examples of computer-readable storage media (CRSM) as that term is used herein.

The DBMS 1016 depicted as being loaded into the memory 1012 may support functionality for accessing, retrieving, storing, and/or manipulating data stored in the datastore(s) 234, data stored in the memory 1012, and/or data stored in the data storage 1006. The DBMS 1016 may use any of a variety of database models (e.g., relational model, object model, etc.) and may support any of a variety of query languages. It should be appreciated that any data and/or computer-executable instructions stored in the memory 1012, including any of the program modules, the O/S 1014, and the DBMS 1016, may be additionally, or alternatively, stored in the data storage 1006 and/or external datastore(s) (e.g., one or more of the datastore(s) 1002) and loaded into the memory 1012 therefrom.

The processor(s) 1004 may be configured to access the memory 1012 and execute computer-executable instructions stored therein. For example, the processor(s) 1004 may be configured to execute computer-executable instructions of the various program modules of the funds dispensing computer 1002 to cause or facilitate various operations to be performed in accordance with one or more embodiments of the disclosure. The processor(s) 1004 may include any suitable processing unit capable of accepting digital data as input, processing the input data in accordance with stored computer-executable instructions, and generating output data. The processor(s) 1004 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), and so forth.

The funds dispensing computer 1002 may further include one or more I/O interfaces 1008 that may facilitate the receipt of input information by the funds dispensing computer 1002 from one or more I/O devices as well as the output of information from the funds dispensing computer 1002 to the one or more I/O devices. The I/O devices may include, for example, one or more user interface devices that facilitate interaction between a user and the funds dispensing computer 1002 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, a card reader, and so forth.

The funds dispensing computer 1002 may be configured to communicate with any of a variety of other systems, platforms, networks, devices, and so forth (e.g., the customer service system 110, the card issuer system 112, etc.) via one or more of the network(s) 120. The funds dispensing computer 1002 may include one or more network interfaces 210 that may facilitate communication between the funds dispensing computer 1002 and any of the systems, networks, platforms, devices or components of the architecture 100.

Those of ordinary skill in the art will appreciate that the illustrative funds dispensing computer 1002 depicted in FIG. 10, and more generally, the funds dispensing system 116 or any of the other illustrative components of the architecture 100 depicted in FIG. 1, may include alternate and/or additional hardware, software or firmware components beyond those described or depicted without departing from the scope of the disclosure. More particularly, it should be appreciated that software, firmware or hardware components depicted as forming part of funds dispensing computer 1002 are merely illustrative and that some components may not be present or additional components may be provided in various embodiments. While various illustrative program modules have been depicted as software modules loaded into a memory, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules.

Referring now to FIG. 11 in conjunction with FIG. 10, at block 1102, a user-selectable option may be presented to a cardholder to access funds held at a financial account associated with an existing card account identifier that has been potentially compromised or that is otherwise unavailable for use. The user-selectable option may be presented to the cardholder via one or more user interfaces of the funds dispensing computer 1002. The funds dispensing computer 1002 may include, for example, an ATM, a POS device, a kiosk, or the like present at a funds dispensing location. The user interface(s) may include a display, a haptic interface, a speaker, or the like that is capable of presenting the option to the cardholder in some manner. The user may be the cardholder or a user of the funds dispensing system acting on behalf of the cardholder such as, for example, a cashier at a POS terminal, a teller at a financial institution branch, and so forth.

At block 1104, the funds dispensing computer 1002 may receive an indication of a selection by or on behalf of the cardholder of the option presented at block 1102. As a non-limiting example, the cardholder may supply input to the ATM, POS device, or similar device indicative of the selection by interacting with a touch display or push-button interface thereof. As another non-limiting example, the ATM machine or POS device may be configured with voice recognition software and the cardholder may indicate his/her selection by providing voice commands. As yet another non-limiting example, the cardholder may indicate his/her selection via a proxy (e.g., by instructing an attendant, a cashier, a financial institution teller, or the like of his/her desire to obtain funds using a card account identifier associated with conditions for temporary use). The proxy may then input information to the funds dispensing system on behalf of the cardholder. It should be appreciated that the above examples are merely illustrative and not exhaustive.

At block 1106, the funds dispensing computer 1002 or a financial institution teller may prompt the cardholder for a token 1020 corresponding to a card account identifier associated with temporary conditions for use and at block 1108 the funds dispensing computer 1002 may receive the token 1020.

The cardholder may provide the token 1020 via a suitable I/O interface 1008 of the funds dispensing computer 1002, or may provide the token 1020 to a proxy (e.g., attendant, cashier, financial institution branch teller), who may provide the token 1020 to a local computing device. Alternatively, the token 1020 may be transmitted from a user's mobile device to the funds dispensing computer 1002 via a suitable network interface 1010. Further, in certain example embodiments, the funds dispensing computer 1002 may include or may be in communication with a scanner, reader, or the like that is configured to read a representation of the token 1020 such as, for example, a character string, a barcode, a QR code, or the like that encodes the token 1020. As previously described, the card account identifier to which the token 1020 corresponds may be a temporary card account identifier associated with conditions for temporary use, an existing card account identifier associated with temporary conditions for use, or a new permanent card account identifier associated with initial conditions for temporary use.

The card account identifier associated with conditions for temporary use may be a combination of alphanumeric or numeric only characters and may be equivalent in length to a standard card account identifier. The token 1020, on the other hand, may be of a broader character set than the card account identifier and/or may be of a different length than this standard length. For example, the token 1020 may be an 11-digit numeric identifier while the temporary use card account identifier may be a standard 16-digit account identifier. The funds dispensing computer 1002 may thus determine that the token 1020 corresponds to a temporary use card account identifier based on the character set and/or a length of the token 1020. Accordingly, in certain example embodiments, it may not be necessary for the user to specifically indicate that user input representative of a token is being provided. Alternatively, separate a first user selectable option may be provided for submitting user input representative of a token and a second different user selectable option may be provided for submitting user input representative of a temporary use card account identifier.

Upon receipt of the token 1020 at block 1108, computer-executable instructions of the token transformation module(s) 1018 may be executed at block 1110 to access a stored mapping (e.g., database table 1024) that may include multiple data records, where each data record specifies a correspondence between a particular identifier and a corresponding portion of a card issuer identifier. The mapping 1024 may be stored in one or more of the datastore(s) 1022 which may include any of the datastore(s) 136 or any of the other datastores depicted in FIG. 1. In certain example embodiments, the stored mapping 1024 may have been provided to the funds dispensing system 116 by the customer service system 110, the service provider system 118, or the like.

In certain example embodiments, one of the identifiers depicted in the first column of the example database table 1024 shown in FIG. 10 may correspond to a first token segment 1030 of the token 1020. For example, a first portion of the temporary use card account identifier may have been replaced with one of the identifiers in the first column of the example database table 1024 to construct the token 1020. As such, the first portion of the temporary use card account identifier that was replaced with one of the identifiers in the first column of the table 1024 may be one of the identifiers in the second column of the table 1024, or more specifically, may be the identifier in the second column that is included in a same data record (e.g., a same row) as the identifier in the first column that replaced the first portion of the temporary use card account identifier. In certain example embodiments, the identifiers depicted in the second column of the table 1024 may be BINs corresponding to card issuers or payment networks.

Referring again to the method 1100 of FIG. 11, upon accessing the stored table 1024, at block 1112 computer-executable instructions of the token transformation module(s) 1018 may be executed to locate a data record within the table 1024 that includes a first token segment 1030 of the token 1020. More specifically, a first token segment 1030 including an initial character string (e.g., first digit or character) of the token 1020 of the token 1020 may be identified and a set of data records 1026 in the table 1024 may be searched to locate the data record 1028 that includes a data field in the mapping 1024 (e.g., a data field in the first column of the mapping table 1024) that is populated with a character or combination of characters that matches the first token segment 1030.

Upon locating the data record 1028, at block 1114 computer-executable instructions of the token transformation module(s) 1018 may be executed to determine a portion of a card account identifier associated with the identifier in the data record 1028 that matches the first token segment 1030. The portion of the card account identifier may be a value populated in another data field of the data record 1028 (e.g., a data field in the second column of the mapping table 1024). As noted previously, the portion of the card account identifier may correspond to a particular BIN. The data field populated with the portion of the card account identifier in the data record 1028 may be located using a label, tag, or other identifier that identifies the data field as being located, for example, the second column of the mapping table 1024.

Upon determining the appropriate portion of the card issuer/payment network identifier, at block 1116 computer-executable instructions of the token transformation module(s) 1018 may be executed to construct the card account identifier 1036 associated with conditions for temporary use by replacing the first token segment 1030 with the portion of the card account identifier from the data record 1028. Remaining token segments 1032 and 1034 may be retained to form the complete card account identifier 1036. Upon constructing the card account identifier, processing may continue with optional block 1118 or operation 810 of FIG. 8A.

A first one or more digits of the token segment 1032 may correspond to a particular financial institution of a group of one or more financial institutions that correspond to the portion of the card account identifier associated with the first token segment 1030. The token segment 1034 may be a checksum digit that may be used, at block 1118, to validate an accuracy of the constructed card account identifier using, for example, the Luhn algorithm or any other suitable checksum algorithm. The checksum algorithm employed using the checksum digit may be able to detect potential transposition or single digit errors. While the portions of card account identifiers depicted in the table 1024 are shown as being 6 digits in length, which would in turn cause the token 1020 to be five digits shorter in length than the corresponding card account identifier (e.g., 11 digits instead of 16 digits) assuming a single character/digit first token segment 1030, it should be appreciated that the mapping table 1024 data field corresponding to the first token segment 1030 (e.g., the BIN identifier) may correspond to a greater or lesser number of digits in the card account identifier than the example number of digits depicted for the BINs in the table 1024. Increasing the number of digits in the portion of the card account identifier that map to a particular BIN identifier (and thus first token segment 1030) may reduce the length of the token 1020 (thereby potentially making it easier to remember) and may increase the number of data records in the mapping table 1024, but may also reduce the number of digits in the card account identifier that may be used to identify a particular financial institution and/or the number of simultaneously active temporary use card account identifiers that may be generated Upon validating the accuracy of the constructed card account identifier, processing may continue with operation 810 of FIG. 8A.

In certain example embodiments, rather than providing a stored mapping 1024 of token segments to corresponding portions of temporary use card account identifiers, the mapping may be provided (e.g., embedded) as part of the computer-executable code, instructions, or the like of the token transformation module(s) 1018. Example executable code of the token transformation module(s) 1018 is provided below.

```
//Card account identifier construction from token
import java.io.Console;
import java.util.Arrays;
import java.io.IOException
public class Token {
    public static void main (String args[ ]) throws IOException {
        Console c = System.console( );
        if (c==null) {
            System.err.println ("No console.");
            System.exit (1);
        }
        // This array provides the mapping between token segments and
        // corresponding portions of a temporary use card account
        identifier
        String    binIndex[ ] = new String[10];
                  binIndex[0] = "987654";
                  binIndex[1] = "876543";
                  binIndex[2] = "765432";
                  binIndex[3] = "654321";
                  binIndex[4] = "543210";
                  binIndex[5] = "423109";
                  binIndex[6] = "321098";
                  binIndex[7] = "210987";
                  binIndex[8] = "109876";
                  binIndex[9] = "098765";
        String tokenIn = c.readLine ("Enter the token: ");
        int len = tokenIn.length( );
        char[ ] tokenArray = new char[len];
        char[ ] panArray = new char [len+5];
        // Assign characters of an input string to the token array and the
        // card account identifier array
        for (int i=0; i < len-1; i++) {
            tokenArray[i] = tokenIn.charAt(i);
            panArray[i+6] = tokenIn.charAt(i+1);
        }
        // Assign the last character of the input string to a last index of
        the token array
        tokenArray[len-1] = tokenIn.charAt(len-1);
        int j = Character.getNumericValue(tokenArray[0]);
        if (j<=9 && j>=0) {
        // Populate the card account identifier array with the portion of
        // the temporary use card account identifier using the mapping
            for (int i=0; i < 6; i++)
                panArray[i] = binIndex[j].charAt(i);
        }
        else {
            for (int i=0; i < 6; i++)
                panArray[i]=48;
        }
        // Display the token, the portion of the token that maps to the
        // portion of the card account identifier, and the card account
        // identifier to the console OR indicate that the portion of
        // the token that maps to the portion of the card account identifier
        is invalid
        c.format("%n");
        c.format("Token = ");
        for (int i=0; i<len; i++) {
            c.format ("%1$c", tokenArray[i]);
        }
        c.format ("%n");
        if (j<=9 && j>=0) {
            c.format ("Index = %1$d", j);
            c.format ("%n");
            c.format ("BIN = ");
            c.format (binIndex[j]);
            c.format ("%n");
            c.format ("PAN = ");
            for (int=0; i<len+6; i++) {
                c.format ("%1$c", panArray[i]);
            }
        }
        else {
        c.format ("Index %1$d is invalid", j);
        }
        c.format ("%n");
        c.format ("Conversion Complete. %n");
    }
}
```

As shown in the example executable code above, the mapping between token segments and corresponding portions of card account identifiers may be represented as the string binIndex. A respective value (e.g., a character string representative of the numeric digits of a portion of a temporary use card account identifier) may be assigned to each index of binIndex. Responsive to execution of the example executable code shown above, the character arrays tokenArray and panArray may be generated, and the characters of an input string may be stored in tokenArray. More specifically, the characters of the input string may be written to corresponding memory locations allocated to tokenArray. The memory locations allocated to tokenArray may be contiguous memory locations in virtual and/or physical memory. The characters of the input string may be written to memory locations allocated to tokenArray that are addressable in an order that corresponds to the order of the characters in the input string.

A portion of the characters of the input string such as a portion that excludes the first token segment (e.g., the first character of the input string) may also be stored in panArray. More specifically, the portion of the characters of the input string may be written to corresponding memory locations allocated to panArray. The memory locations allocated to panArray may be contiguous memory locations in virtual and/or physical memory. The portion of the characters of the input string may be written to memory locations allocated to panArray that are addressable in an order that corresponds to the order of the characters in the input string. In certain example embodiments, the portion of the characters of the input string may be written to memory beginning at a particular memory location allocated to panArray that is offset from an initial memory location allocated to panArray by an offset amount corresponding to a difference in length between the token (e.g., the input string) and the corresponding card account identifier. This difference in length may be a difference between an initial index of panArray (e.g., panArray[0]) and an index of panArray that corresponds to the particular memory location beginning at which the portion of the characters of the input string are written. In this manner, later insertion into panArray of the portion of the card account identifier corresponding to the first token segment may be accommodated.

A check may then be performed to determine whether the first token segment (e.g., the value associated with index 0 of tokenArray) is an acceptable value (e.g., corresponds to one of the index values of binIndex). If so, the character string stored in binIndex beginning at a memory location that corresponds to the index of binIndex that matches the first token segment may be stored beginning at the initial memory location allocated to tokenArray. If not, one or more character zeros (e.g., the value 48 in the American Standard Code for Information Interchange (ASCII) character-encoding scheme) may be written beginning at the initial memory location allocated to tokenArray. The character zeros may be written as an error default mechanism to ensure that the card account identifier represented by panArray cannot be used for routing financial transactions. In this manner, if the input string does not include an initial set of one or more characters that corresponds to an acceptable first token segment, a corresponding card account identifier may nonetheless be constructed for display purposes but may be incapable of being used to initiate financial transactions.

Following construction of the card account identifier from the token, the token and the corresponding card account identifier may then be displayed via, for example, a display of the funds dispensing computer 1002. For example, the characters of tokenArray and panArray may be displayed. In certain example embodiments, the characters of panArray may only be displayed if the initial portion of the input string corresponds to an acceptable first token segment. Otherwise, a message may be displayed that indicates that the initial portion of the input string is invalid.

While example types of data structures are depicted in the example code shown above, it should be appreciated that they are provided merely by way of illustration and are not intended to be limiting in any way. For example, in other example embodiments, instead of using a string, the mapping between token segments and corresponding portions of card account identifiers may be represented in the computer-executable code using other types of data structures, where each element of the data structure is, for example, a 2-tuple containing a particular token segment and a corresponding portion of a card account identifier.

The operations described and depicted in the illustrative methods of FIGS. 4-9 may be carried out or performed in any suitable order as desired in various embodiments of the disclosure. Additionally, in certain embodiments, at least a portion of the operations may be carried out in parallel. Furthermore, in certain embodiments, less, more, or different operations than those depicted in FIGS. 4-9 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

That which is claimed is:

1. An automated teller machine (ATM) for constructing a temporary card account identifier associated with one or more conditions for temporary use from a token to fulfill a request to withdraw cash funds, comprising:
    at least one network interface;
    at least one input/output (I/O) interface;
    at least one memory storing computer-executable instructions; and
    at least one processor communicatively coupled to the at least one network interface, the at least one I/O interface, and the at least one memory and configured to access the at least one memory and execute the computer-executable instructions to:
        receive, on behalf of a user via the at least one I/O interface, a user selection indicating a desire to provide a user input associated with a request to withdraw cash funds from available funds of a financial account comprises a token, wherein the token comprises a token character string;
        receive, on behalf of the user via the at least one I/O interface, the user input associated with the request to withdraw cash funds from available funds of the financial account, wherein i) the user input comprises a) the token corresponding to a temporary card account identifier that enables access to the available funds, and b) a requested amount of the cash funds, ii) the token comprises a first token segment comprising a first character of the token, iii) the first character of the token is a numeric digit, iv) the token comprises a second token segment comprising one or more additional characters of the token, and v) the token comprises a third token segment comprising a validation character;
        responsive to receiving the user input comprising the token, construct the temporary card account identifier associated with one or more conditions for temporary use from the first token segment of the token, the second token segment of the token, and the third token segment of the token by:

writing the second token segment beginning at a first memory location of the at least one memory, wherein the first memory location is allocated to an array data structure representative of the temporary card account identifier, writing the third token segment beginning at a second memory location of the at least one memory, wherein the second memory location is allocated to the array data structure, determining that the first token segment corresponds to a particular card account identifier portion stored in a mapping table comprising a plurality of card account identifier portions by determining that a third memory location of the at least one memory is associated with an index of the mapping table that corresponds to the first token segment, wherein the mapping table is stored in a data storage, responsive to determining that the first token segment corresponds to the particular card account identifier portion of the mapping table comprising the plurality of card account identifier portions, using the first token segment to i) search the mapping table to identify a first data field corresponding to the first token segment, and ii) retrieve the particular card account identifier portion from a second data field associated with the first data field from the mapping table, wherein the particular card account identifier portion is stored beginning at the third memory location, and writing the particular card account identifier portion beginning at a fourth memory location of the at least one memory, wherein the fourth memory location is allocated to the array data structure;

initiate validation of the constructed temporary account identifier, wherein the constructed temporary account identifier comprises the particular card account identifier portion, the second token segment, and the validation character;

transmit a request for confirmation that a set of one or more conditions for temporary use of the constructed temporary card identifier is satisfied, the request for confirmation comprising the constructed temporary card identifier, wherein the constructed temporary card identifier has been validated using the validation character;

receive a response to the request for confirmation, the response to the request for confirmation indicating that the set of one or more conditions for temporary use of the constructed temporary card identifier is satisfied, wherein the set of one or more conditions for temporary use of the constructed temporary card identifier comprise one or more of:

i) a threshold number of permitted uses of the constructed temporary card account identifier to access at least a portion of the funds, ii) a maximum amount of the funds to which the constructed temporary card account identifier enables access, maximum amount of the funds to which the constructed temporary card account identifier enables access, iii) an expiration time limit associated with the constructed temporary card account identifier, wherein the temporary card account identifier no longer enables access to any portion of the funds upon or subsequent to the expiration time limit, iv) a maximum amount of the funds to which the constructed temporary card account identifier enables access for each permitted use, v) a geographic constraint constraining use of the constructed temporary card account identifier to a geographic region, or vi) a required mechanism for delivery of the requested amount of the cash funds; and responsive to receiving the response to the request for confirmation indicating that the set of one or more conditions for temporary use of the constructed temporary card identifier is satisfied, fulfill the request to withdraw cash funds by instructing delivery of the requested amount of the cash funds to the user based at least in part on the constructed temporary card identifier, wherein instructing delivery causes the ATM to dispense the requested amount of the cash funds.

2. The ATM of claim 1, wherein the fourth memory location is an initial memory location allocated to the array data structure, and wherein the first memory location is offset from the fourth memory location by an offset value corresponding to the length of the particular card account identifier.

3. The ATM of claim 1, wherein the second memory location is offset from the first memory location by an offset value corresponding a length of the second token segment.

4. The ATM of claim 1, wherein the at least one processor is further configured to validate the constructed temporary card identifier by executing the computer-executable instructions to:

validate an accuracy of the particular card account identifier portion and the second token segment using the validation character of the third token segment.

5. The ATM of claim 1, wherein the user input is first user input, the token is a first token, and the temporary card account identifier is a first temporary card account identifier, and wherein the at least one processor is further configured to execute the computer-executable instructions to:

receive, via the at least one I/O interface, second user input comprising a second token, wherein the second token comprises a fourth token segment and one or more additional token segments;

write the one or more additional token segments beginning at a fifth memory location of the at least one memory, wherein the fifth memory location is allocated to a second array data structure representative of a second temporary card account identifier;

determine that the fourth token segment does not correspond to any particular card account identifier portion of the mapping table stored in the data storage; and write one or more character zeros beginning at a sixth memory location of the at least one memory, wherein the sixth memory location is an initial memory location allocated to the second array data structure, and wherein the third second array data structure is representative of an invalid temporary card account identifier.

6. The ATM of claim 1, wherein the at least one I/O interface comprises at least one of:

i) a physical keypad,
ii) a touch-sensitive panel,
iii) an image capturing device, or
iv) a wireless network interface.

7. The ATM of claim 6, wherein the at least one I/O interface comprises the image capturing device, and wherein the user input comprises at least one of: i) an image of the token character string indicative of the token captured by the image capturing device or ii) a machine-readable encoding of the token captured by the image capturing device.

8. The ATM of claim 1, wherein a first portion of the one or more additional characters of the second token segment corresponds to a particular financial institution of multiple financial institutions associated with the particular card account identifier portion.

9. The ATM of claim 1, wherein a first portion of the one or more additional characters of the second token segment corresponds to a particular financial institution of multiple financial institutions associated with the particular card account identifier portion.

10. The ATM of claim 1, wherein determining that at least one of the one or more conditions for temporary use of the constructed temporary card identifier is satisfied comprises:
   transmitting a request to determine whether the one or more conditions for temporary use of the constructed temporary card identifier are satisfied; and
   receiving a response to the request to determine whether the one or more conditions for temporary use of the constructed temporary card identifier are satisfied.

11. A method for constructing a temporary card account identifier associated with one or more conditions for temporary use from a token to fulfill a request to withdraw cash funds, comprising:
   receive, by at least one computer processor of an automated teller machine (ATM) on behalf of a user, a user selection indicating a desire to provide a user input associated with a request to withdraw cash funds from available funds of a financial account comprises a token, wherein the token comprises a token character string;
   receiving, by the at least one computer processor of the ATM on behalf of the user, via at least one input/output (I/O) interface of the ATM, the user input associated with the request to withdraw cash funds from available funds of the financial account, wherein i) the user input comprises a) the token corresponding to a temporary card account identifier that enables access to the available funds, and b) a requested amount of the cash funds, ii) the token comprises a first token segment comprising a first character of the token, iii) the first character of the token is a numeric digit, iv) the token comprises a second token segment comprising one or more additional characters of the token, and v) the token comprises a third token segment comprising a validation character;
   responsive to receiving the user input comprising the token, constructing the temporary card account identifier associated with one or more conditions for temporary use from the first token segment of the token, the second token segment of the token, and the third token segment of the token by:
      writing, by the at least one computer processor of the ATM, the second token segment beginning at a first memory location of at least one memory, wherein the first memory location is allocated to an array data structure representative of the temporary card account identifier,
      writing, by the at least one computer processor of the ATM, the third token segment beginning at a second memory location of the at least one memory, wherein the second memory location is allocated to the array data structure,
      determining, by the at least one computer processor of the ATM, that the first token segment corresponds to a particular card account identifier portion stored in a mapping table comprising a plurality of card account identifier portions by determining that a third memory location of the at least one memory is associated with an index of the mapping table that corresponds to the first token segment, wherein the mapping table is stored in a data storage,
      responsive to determining that the first token segment corresponds to the particular card account identifier portion of the mapping table comprising the plurality of card account identifier portions, using the first token segment to i) search the mapping table to identify a first data field corresponding to the first token segment, and ii) retrieve the particular card account identifier portion from a second data field associated with the first data field from the mapping table, wherein the particular card account identifier portion is stored beginning at the third memory location, and
      writing, by the at least one computer processor of the ATM, the particular card account identifier portion beginning at a fourth memory location of the at least one memory, wherein the fourth memory location is allocated to the array data structure;
   initiating, by the at least one computer processor of the ATM, validation of the constructed temporary account identifier, wherein the constructed temporary account identifier comprises the particular card account identifier portion, the second token segment, and the validation character;
   transmitting, by the at least one computer processor of the ATM, a request for confirmation that a set of one or more conditions for temporary use of the constructed temporary card identifier is satisfied, the request for confirmation comprising the constructed temporary card identifier, wherein the constructed temporary card identifier has been validated using the validation character;
   receiving, by the at least one computer processor of the ATM, a response to the request for confirmation, the response to the request for confirmation indicating that the set of one or more conditions for temporary use of the constructed temporary card identifier is satisfied, wherein the set of one or more conditions for temporary use of the constructed temporary card identifier comprise one or more of:
      i) a threshold number of permitted uses of the temporary card account identifier to access at least a portion of the funds,
      ii) a maximum amount of the funds to which the constructed temporary card account identifier enables access, maximum amount of the funds to which the constructed temporary card account identifier enables access,
      iii) an expiration time limit associated with the temporary card account identifier, wherein the temporary card account identifier no longer enables access to any portion of the funds upon or subsequent to the expiration time limit,
      iv) a maximum amount of the funds to which the temporary card account identifier enables access for each permitted use,
      v) a geographic constraint constraining use of the temporary card account identifier to a geographic region, or
      vi) a required mechanism for delivery of the requested amount of the cash funds; and responsive to receiving the response to the request for confirmation indicating that the set of one or more conditions for temporary use of the constructed temporary card identifier is satisfied, fulfill the request to withdraw cash funds by instructing delivery of the requested amount of the cash funds to the user based at least in part on the constructed temporary card identifier, wherein instructing delivery causes the ATM to dispense the requested amount of the cash funds.

12. The method of claim 11, wherein the fourth memory location is an initial memory location allocated to the array data structure, and wherein the first memory location is offset from the fourth memory location by an offset value corresponding to the length of the particular card account identifier.

13. The method of claim 11, wherein the second memory location is offset from the first memory location by an offset value corresponding a length of the second token segment.

14. The method of claim 11, further comprising:
validating, by the at least one computer processor of the ATM, an accuracy of the particular card account identifier portion and the second token segment using the validation character of the third token segment.

15. The method of claim 11, wherein the user input is first user input, the token is a first token, and the card account identifier is a first card account identifier, the method further comprising:
receiving, by the at least one computer processor of the ATM, via the at least one I/O interface, second user input comprising a second token, wherein the second token comprises a fourth token segment and one or more additional token segments;
writing, by the at least one computer processor of the ATM, the one or more additional token segments beginning at a fifth memory location of the at least one memory, wherein the fifth memory location is allocated to a third data structure representative of a second card account identifier;
determining, by the at least one computer processor of the ATM, that the fourth token segment does not correspond to any card account identifier portion of the mapping table stored in the data storage; and
writing, by the at least one computer processor of the ATM, one or more character zeros beginning at a sixth memory location of the at least one memory, wherein the sixth memory location is an initial memory location allocated to the third data structure, and wherein the third data structure is representative of an invalid card account identifier.

16. The method of claim 11, further comprising:
determining, by the at least one computer processor of the ATM, that the user input comprises the token based at least in part on at least one of: i) a difference between a length of the token and a length of the card account identifier or ii) presence of a particular character in the token that is not included in a set of eligible characters for the card account identifier.

17. The method of claim 11, wherein the at least one I/O interface comprises at least one of:
i) a physical keypad,
ii) a touch-sensitive panel,
iii) an image capturing device, or
iv) a wireless network interface.

18. The method of claim 17, wherein the at least one I/O interface comprises the image capturing device, and wherein the user input comprises at least one of: i) an image of the token character string indicative of the token captured by the image capturing device or ii) a machine-readable encoding of the token captured by the image capturing device.

19. The method of claim 11, wherein determining that at least one of the one or more conditions for temporary use of the constructed temporary card identifier is satisfied comprises:
transmitting a request to determine whether the one or more conditions for temporary use of the constructed temporary card identifier are satisfied; and
receiving a response to the request to determine whether the one or more conditions for temporary use of the constructed temporary card identifier are satisfied.

* * * * *

UNITED STATES PATENT AND TRADEMARK OFFICE
CERTIFICATE OF CORRECTION

PATENT NO. : 11,042,850 B2  
APPLICATION NO. : 14/588201  
DATED : June 22, 2021  
INVENTOR(S) : Lucia Specogna et al.

Page 1 of 1

It is certified that error appears in the above-identified patent and that said Letters Patent is hereby corrected as shown below:

In the Claims

<u>Column 56</u>
Line 56, "wherein the third second array data" should read --wherein the second array data--

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*